US012508196B2

(12) United States Patent
Yan

(10) Patent No.: US 12,508,196 B2
(45) Date of Patent: Dec. 30, 2025

(54) MASSAGE DEVICE

(71) Applicant: Dongguan Qunan Technology Co., Ltd., Guangdong (CN)

(72) Inventor: Bo Yan, Guangdong (CN)

(73) Assignee: Dongguan Qunan Technology Co., Ltd., Guangdong (CN)

( * ) Notice: Subject to any disclaimer, the term of this patent is extended or adjusted under 35 U.S.C. 154(b) by 0 days.

(21) Appl. No.: 19/027,334

(22) Filed: Jan. 17, 2025

(65) Prior Publication Data

US 2025/0161146 A1 May 22, 2025

Related U.S. Application Data

(63) Continuation-in-part of application No. 18/664,306, filed on May 15, 2024, now Pat. No. 12,201,574,
(Continued)

(30) Foreign Application Priority Data

Jun. 21, 2024 (CN) ......................... 202421443425.5

(51) Int. Cl.
*A61H 19/00* (2006.01)
*A61H 7/00* (2006.01)
(Continued)

(52) U.S. Cl.
CPC ............. *A61H 19/44* (2013.01); *A61H 7/005* (2013.01); *A61H 7/007* (2013.01); *A61H 11/00* (2013.01);
(Continued)

(58) Field of Classification Search
CPC ........ A61H 19/44; A61H 19/00; A61H 19/30; A61H 19/32; A61H 19/34; A61H 19/40;
(Continued)

(56) References Cited

U.S. PATENT DOCUMENTS 2,247,440 A * 7/1941 Martin .................. A61H 7/005
180/19.1
2,263,219 A 11/1941 Lybarger
(Continued)

FOREIGN PATENT DOCUMENTS

CN 1160343 A 9/1997
CN 201154068 Y * 11/2008 ............. A61H 19/44
(Continued)

OTHER PUBLICATIONS

The Office Action of RU application No. 2023131322/14 issued on Feb. 5, 2024.
(Continued)

*Primary Examiner* — Tu A Vo
(74) *Attorney, Agent, or Firm* — ScienBiziP, P.C.

(57) ABSTRACT

A massage device includes: a shell with a tubular portion for hole-shaped part insertion, providing a first stimulus; a recess within the tubular portion, defining a moving space connected to the outside via an opening; a massage module with at least one massage head in the moving space, protruding via the opening for a second stimulus; and a driving assembly with a motor, transmission, and connecting member. The connecting member moves the massage head back and forth in the groove area.

11 Claims, 26 Drawing Sheets

Related U.S. Application Data which is a continuation-in-part of application No. 18/635,094, filed on Apr. 15, 2024, now Pat. No. 12,201,572, which is a continuation of application No. 18/372,701, filed on Sep. 26, 2023, now Pat. No. 11,957,634, which is a continuation of application No. 18/118,749, filed on Mar. 8, 2023, now Pat. No. 11,771,619.

(51) Int. Cl.
*A61H 11/00* (2006.01)
*A61H 21/00* (2006.01)
*A61H 23/02* (2006.01)

(52) U.S. Cl.
CPC ............. *A61H 19/30* (2013.01); *A61H 19/34* (2013.01); *A61H 21/00* (2013.01); *A61H 23/0254* (2013.01); *A61H 2201/1215* (2013.01); *A61H 2201/1676* (2013.01); *A61H 2201/1692* (2013.01)

(58) Field of Classification Search
CPC ........ A61H 7/005; A61H 11/00; A61H 21/00; A61H 15/0085; A61H 11/02; A61H 23/0254; A61H 2201/123; A61H 2201/149; A61H 2205/087
See application file for complete search history.

(56) References Cited

U.S. PATENT DOCUMENTS 3,675,644 A * 7/1972 Laskowitz ......... A61H 15/0078 601/103
3,884,224 A * 5/1975 Garcia ................... A61H 7/005 601/144
5,081,986 A * 1/1992 In ........................... A61H 7/006 601/144
5,395,301 A * 3/1995 Russek ................ A61H 31/006 601/19
5,460,597 A 10/1995 Hopper
5,657,765 A 8/1997 Est
5,725,473 A 3/1998 Taylor
5,843,006 A 12/1998 Phillips et al.
6,190,339 B1 2/2001 Imazaike et al.
6,422,993 B1 7/2002 Hudson
6,551,262 B1 * 4/2003 Lechtman .............. A61B 17/54 601/143
6,632,185 B2 * 10/2003 Chen .................. A61H 15/0085 600/38
8,308,631 B2 * 11/2012 Kobashikawa ........ A61H 19/40 600/38
9,119,765 B2 * 9/2015 Topolev ................. A61H 19/44
9,289,348 B2 3/2016 Kanbar et al.
9,339,434 B1 * 5/2016 Mayfield ................ A61H 19/44
9,717,645 B2 * 8/2017 Fima ...................... A61H 19/44
9,737,457 B2 8/2017 Allen
10,874,579 B1 * 12/2020 Rembert .............. A61H 23/006
10,940,076 B2 * 3/2021 Haddock ............ A61H 15/0085
10,940,078 B1 3/2021 Lee
11,229,574 B2 * 1/2022 Haddock ................ A61H 19/34
11,369,545 B1 6/2022 He
11,491,078 B1 11/2022 He
11,633,327 B1 4/2023 Wu
D1,000,628 S 10/2023 Yangguan
12,036,176 B1 * 7/2024 Wang ................. A61H 23/0263
12,064,386 B1 * 8/2024 Yan ........................ A61H 23/02
12,127,993 B1 * 10/2024 Peng .................. A61H 23/0263
12,171,710 B1 * 12/2024 Huang ................... A61H 19/44
12,290,487 B1 * 5/2025 Cao ...................... A61H 23/006
2004/0082831 A1 * 4/2004 Kobashikawa ........ A61H 19/32 600/38
2007/0129599 A1 6/2007 Nan
2009/0306561 A1 12/2009 Naganmna
2010/0160840 A1 * 6/2010 Murphy ................. A61H 7/005 601/112
2012/0215141 A1 8/2012 Peddicord
2013/0261385 A1 10/2013 Zipper
2014/0018612 A1 * 1/2014 Lin ........................ A61H 19/40 600/38
2014/0243591 A1 * 8/2014 Weller ................... A61H 19/34 600/38
2014/0296626 A1 10/2014 Butler
2014/0309565 A1 * 10/2014 Allen ..................... A61H 19/44 601/46
2015/0148592 A1 5/2015 Kanbar
2015/0196453 A1 7/2015 Wu
2015/0272814 A1 10/2015 Chen
2015/0335520 A1 * 11/2015 Dills ...................... A61H 19/30 601/46
2015/0351998 A1 * 12/2015 Levy ...................... A61H 23/02 601/46
2016/0051438 A1 2/2016 Hahr
2016/0120737 A1 5/2016 Sedic
2016/0184178 A1 6/2016 Hahr
2017/0100303 A1 * 4/2017 Kotlov ................... A61H 21/00
2017/0105896 A1 * 4/2017 Derwin .................. A61H 19/34
2017/0326022 A1 * 11/2017 Fima ...................... A61H 19/44
2018/0140502 A1 * 5/2018 Shahoian ............... A61H 19/44
2020/0085674 A1 * 3/2020 Haddock ................ A61H 21/00
2020/0085680 A1 * 3/2020 Haddock ................ A61H 21/00
2020/0085681 A1 3/2020 Haddock et al.
2021/0393474 A1 12/2021 Hernan
2022/0160577 A1 5/2022 Cai
2022/0257459 A1 * 8/2022 Dickinson .......... A61H 23/0263
2023/0024137 A1 * 1/2023 Larkin ................... A61H 19/44
2023/0355463 A1 11/2023 Cirillo-Schmidt
2024/0108538 A1 * 4/2024 Chen ................. A61H 23/0254
2024/0277562 A1 * 8/2024 Wang ........................ A61H 7/00
2024/0299239 A1 * 9/2024 Yan .................... A61H 23/0254
2024/0307261 A1 * 9/2024 Wang ..................... A61H 7/007
2024/0382376 A1 * 11/2024 Zhang ................ A61H 23/0254
2025/0017814 A1 * 1/2025 Li .......................... A61H 19/44
2025/0195320 A1 * 6/2025 Tu ........................... H02P 25/03
2025/0318980 A1 * 10/2025 Yu .......................... A61H 7/004

FOREIGN PATENT DOCUMENTS

CN 102429805 A 5/2012
CN 102846460 A 1/2013
CN 103393530 A 11/2013
CN 203493906 U * 3/2014 ............. A61H 35/00
CN 204319236 U * 3/2014
CN 103356370 B 12/2014
CN 204890546 U 12/2015
CN 106102686 B 4/2018
CN 108743300 A 11/2018
CN 111419660 A 7/2020
CN 211095924 U 7/2020
CN 214285821 U 9/2021
CN 11434412 A 4/2022
CN 114344122 A 4/2022
CN 217409236 U 9/2022
CN 116816889 A * 9/2023 ............. A61H 23/02
CN 115737405 B 6/2024
CN 119257928 A * 1/2025 ............. A61H 23/02
DE 2437053 A1 * 9/2010
DE 202024102402 U1 * 5/2024 ......... A61H 23/0254
EP 3925588 A1 12/2021
EP 015002671-0001 S 11/2022
EP 4406526 A1 7/2024
FR 2942713 A1 * 9/2010 ............. A61H 19/44
IT 20100010 A1 10/2011
JP 2004313689 Y * 11/2004 ............. A61H 19/34
JP 2006110289 A 4/2006
JP 2007296299 A 11/2007
JP 2008188401 A 8/2008
JP 3170366 U * 9/2011
KR 101415661 B1 * 7/2014 ......... A61H 15/0078
KR 2020180001751 U 6/2018
KR 20220096692 A 7/2022
RU 2742137 C2 2/2021

(56) References Cited

FOREIGN PATENT DOCUMENTS

| | | | | | |
|---|---|---|---|---|---|
| WO | 0135895 | A | | 5/2001 | |
| WO | WO-0135895 | A1 | * | 5/2001 | ............. A61H 19/34 |
| WO | 2014180166 | A | | 11/2014 | |
| WO | WO-2014180166 | A1 | * | 11/2014 | ............. A61H 35/00 |
| WO | 2015096179 | A1 | | 7/2015 | |
| WO | WO-2016033640 | A1 | * | 3/2016 | ............. A61H 19/44 |
| WO | 2016103100 | A1 | | 6/2016 | |

OTHER PUBLICATIONS

Extended European Search Report Dated May 7, 2024 for corresponding European Application No. 23211161.7.
Notice of refusal of counterpart Japanese Patent Application No. 2023-200162 Issued on Jul. 9, 2024.
Notice of Public Submission of counterpart Japanese Patent Application No. 2023--200162 Issued on Aug. 20, 2024.
Supplementary document for procedures of counterpart Japanese Patent Application No. 2023-200162 Issued on Aug. 15, 2024.
Office Action Dated Sep. 10, 2024 in Ex Parte Reexamination of U.S. Appl. No. 90/019,477 Associated with U.S. Pat. No. 11,771,619.
Response to the Office Action in Ex Parte Reexamination of U.S. Appl. No. 90/019,477 Associated with U.S. Pat. No. 11,771,619.
Declaration/Affidavit under 37 C.F.R. § 1.130 as Flied along with the Response to Office Action in Ex Parte Reexamination of U.S. Appl. No. 90/019,477 Associated with U.S. Pat. No. 11,771,619.
Purchase and Sale Contract (Exhibit A) as Filed along with the Response to Office Action in Ex Parte Reexamination of U.S. Appl. No 90/019,477 Associated with U.S. Pat. No. 11,771,619.
Purchase Declaration (Exhibit B) as Filed along with the Response to Office Action in Ex Parte Reexamination of U.S. Appl. No. 90/019,477 Associated with U.S. Pat. No. 11,771,619.
Screenshot of Product Sales Interface on AliExpress (Exhibit C) as Flied along With the Response to Office Action in Ex Parte Reexamination of U.S. Appl. No. 90/019,477 Associated with U.S. Pat. No. 11,771,619.
Screenshot of Product Sales interface on AliExpress (Exhibit D) as Flied along with the Response to Office Action in Ex Parte Reexamination of U.S. Appl. No. 90/019,477 Associated with U.S. Pat. No. 11,771,619.
Purchase Orders (Exhibit E) as Filed along with the Response to Office Action in Ex Parte Reexamination of U.S. Appl. No. 90/019,477 Associated with U.S. Pat. No. 11,771,619.
AliExpress User Manual (Exhibit F) as Filed along with the Response to Office Action in Ex Parte Reexamination of U.S. Appl. No. 90/019,477 Associated with U.S. Pat. No. 11,771,619.
Reexam Certificate of Service as Filed along with the Response to Office Action in Ex Parte Reexamination of U.S. Appl. No. 90/019,477 Associated with U.S. Pat. No. 11,771,619.
Examiner interview Summary Record of U.S. Appl. No. 90/019,477 Associated with U.S. Pat. No. 11,771,619.
Notice of Public Submission of Counterpart European Patent Application No. 23211161. 7 Issued on Sep. 19, 2024.
Notice of Refusal Dated Oct. 29, 2024 for Corresponding Japanese Patent Application No. 2023-200162.

* cited by examiner

MASSAGE DEVICE

CROSS-REFERENCE TO RELATED APPLICATIONS

This application is continuation in part application of application Ser. No. 18/664,306, filed on May 15, 2024 which is a continuation in part application of application Ser. No. 18/635,094, filed on Apr. 15, 2024, which is a continuation application of application Ser. No. 18/372,701, filed on Sep. 26, 2023, and now patented as U.S. Pat. No. 11,957,634 on Apr. 16, 2024, which is a continuation application of application Ser. No. 18/118,749, filed on Mar. 8, 2023, and now patented as U.S. Pat. No. 11,771,619 on Oct. 3, 2023, the entire contents of which are hereby incorporated by reference.

TECHNICAL FIELD

The present disclosure relates to a massage device.

BACKGROUND

With the development of society and economy, the pace of life is getting faster, and the pressure of work is getting higher. Thus, the demand for physical relaxation is increasing, and consumer-grade massage device is becoming popular. In order to meet consumers' demands, a variety of massage devices are available in the market.

However, most of the massage elements of the massage devices, in particularly the massage elements in sex toys, are limited to linear reciprocating motions. Such massage devices are relatively simple in actions, and the massage heads of the massage devices resist against portions of a human body during operation, it may be difficult to manipulate.

BRIEF DESCRIPTION OF DRAWINGS

Embodiments of the present disclosure will now be described, by way of embodiment, with reference to the attached figures. The structure, operation, and advantages of the present invention will become further apparent upon consideration of the following description taken in conjunction with the accompanying figures. The figures are intended to be illustrative, and not limiting.

DETAILED DESCRIPTION

Figure 1:
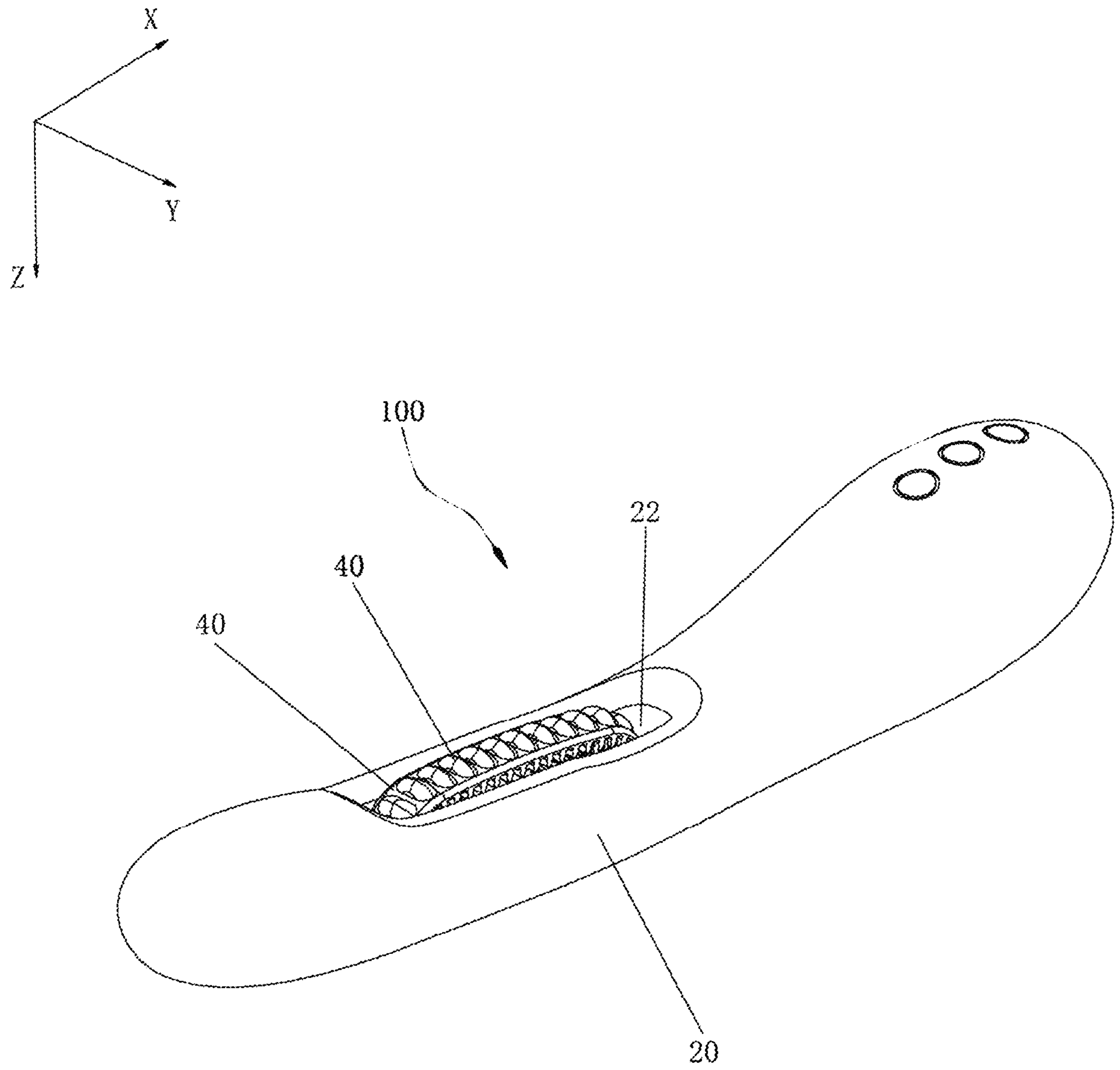
FIG. 1 is a schematic, assembled view of a massage device according to a first embodiment of the present application.

In the description that follows, numerous details are outlined to provide a thorough understanding of the present invention. It will be appreciated by those skilled in the art that variations of these specific details are possible while still achieving the results of the present invention.

Exemplary illustrative embodiments of the invention should be interpreted as example(s) and non-limiting. The relationship between various arms, where they are located, their composition(s), their operation and sometimes their sizes relative to the desired operation of the invention are not significant.

Referring to FIGS. 1-5, a massage device 100 according to an embodiment of the present application includes a shell 20, a driving assembly 30 supported by the shell 20, and a massage member 40 connected to the driving assembly 30 in a transmission way. During use, a front portion of the shell 20 may be inserted into a human body, particularly a rectum or a vagina of the human body. A vibration motor 50 is set inside the front portion of the shell 20, which generates a stimulation effect on a clitoris or a prostate of the human body through vibration.

The shell 20 is elongated and generally rod-shaped. A moving space 22 is defined in a middle portion of the shell 20 along its longitudinal direction (i.e., X-direction). The massage member 40 at least partly extends into the moving space 22 of the shell 20, and is driven to rotate in the moving space 22 under the action of the driving assembly 30. The rotating massage member 40 generates a kneading stimulation effect on a vaginal wall or a rectal wall of the human body, further stimulating the clitoris or the prostate, making it easier for the users to reach orgasm, thereby obtaining a more comfortable sexual experience.

Figure 3:
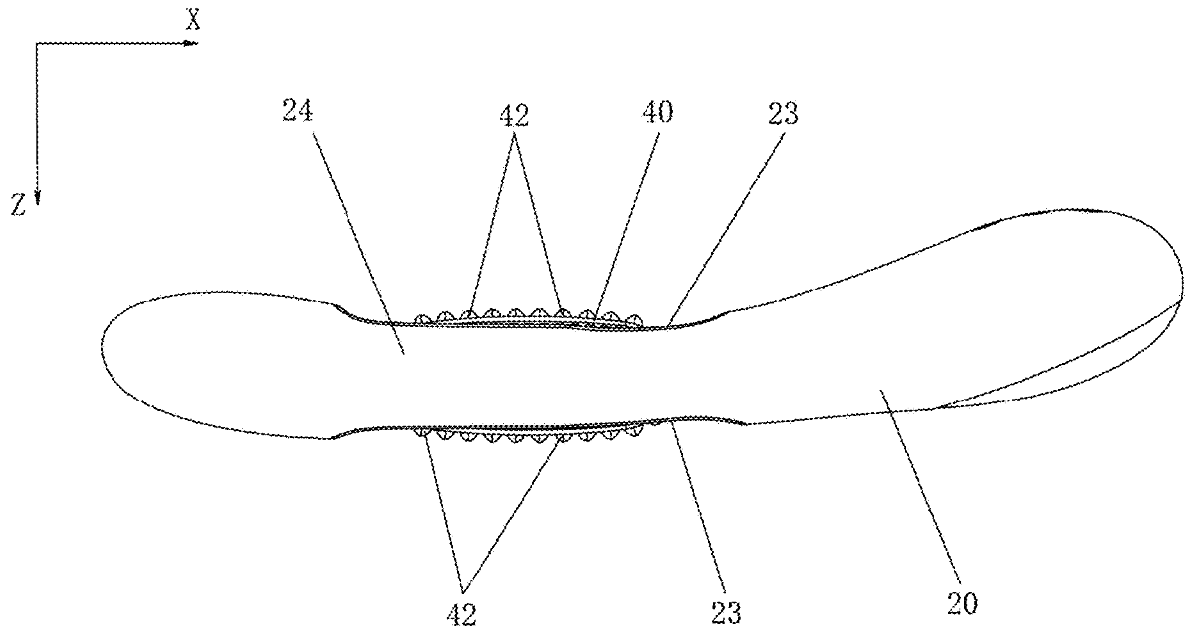
FIG. 3 is a side view of the massage device of FIG. 1.
Figure 4:
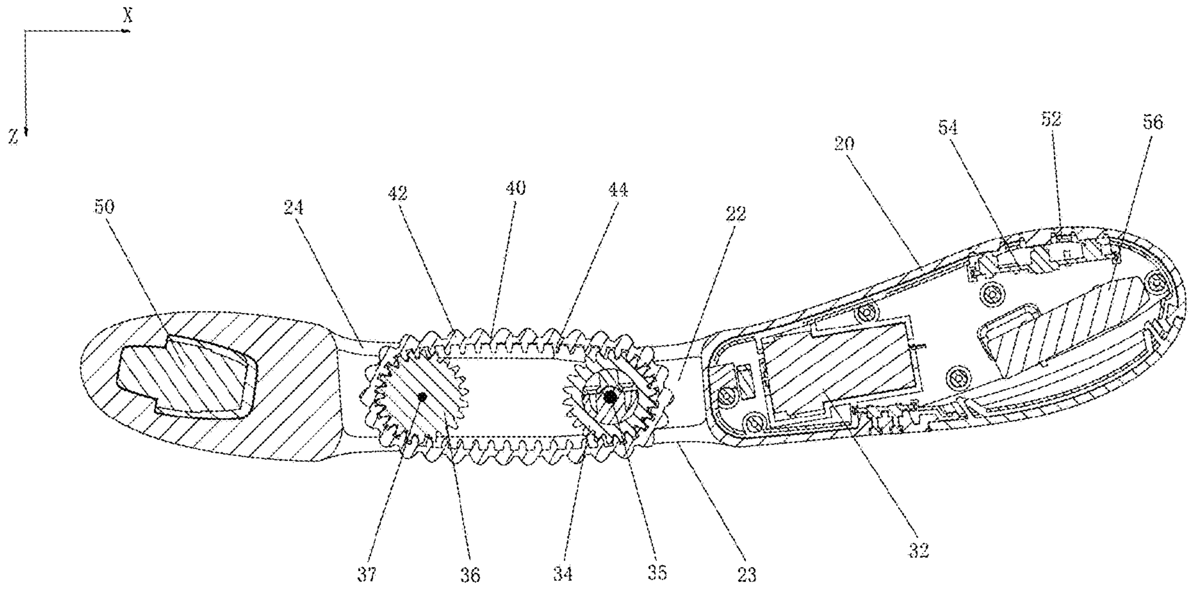
FIG. 4 is a cross sectional view of the massage device taken along line IV-IV of FIG. 2.

As shown in FIG. 3 and FIG. 4, the moving space 22 extends through two opposite sides of the shell 20, such as, extends along Z-direction through top and bottom sides of the shell 20. That is, in the Z-direction, a depth of the moving space 22 is substantially equal to a thickness of the shell 20. Two openings 23 are defined at top and bottom sides of a lateral wall of the shell 20, respectively. The moving space 22 communicates with an external environment out of the shell 20 through the openings 23, and the massage member 40 may extend into the external environment via the opening 23 to directly contact the vaginal wall or rectal wall.

In this embodiment, a size of the whole massage member 40 in the Z-direction is greater than a depth of the moving space 22 in the Z-direction, top and bottom portions of the massage member 40 extend beyond the moving space 22 of the shell 20 into the upper and lower sides of the shell 20 through the openings 23, respectively. Thus, the massage member 40 can simultaneously come into contact with portions of the rectum wall/vaginal wall located at its upper and lower sides, which increases a stimulated area of the massage member 40 of the present massage device 100 on the human body.

Figure 5:
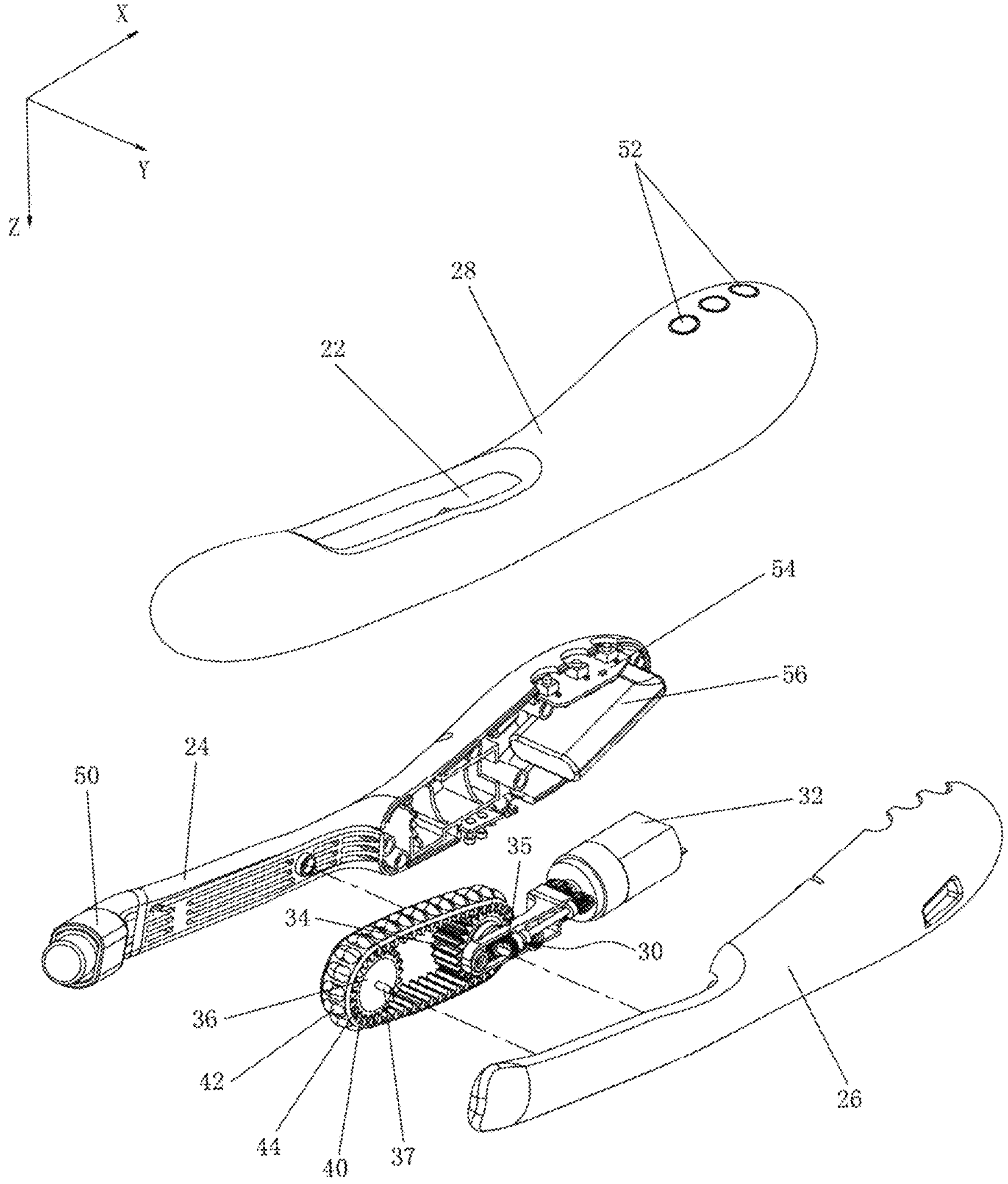
FIG. 5 is a schematic, exploded view of the massage device of FIG. 1.
Figure 6:
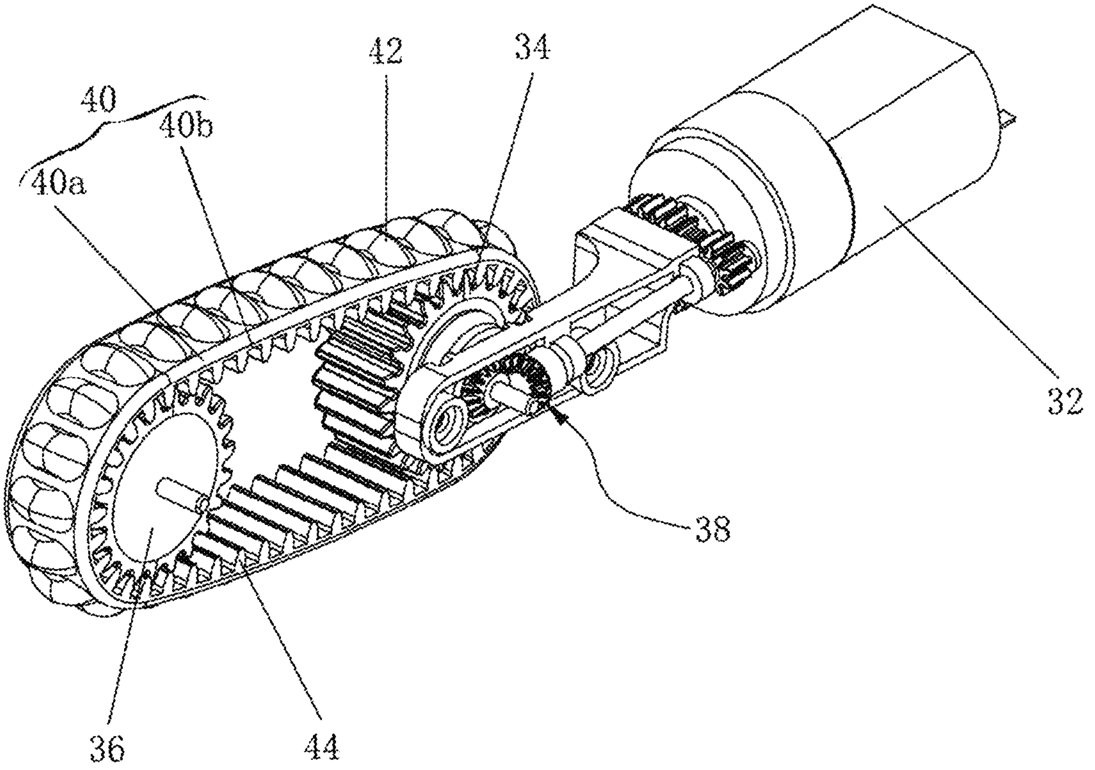
FIG. 6 is a schematic view of a massage member and a driving assembly of the massage device.
Figure 7:
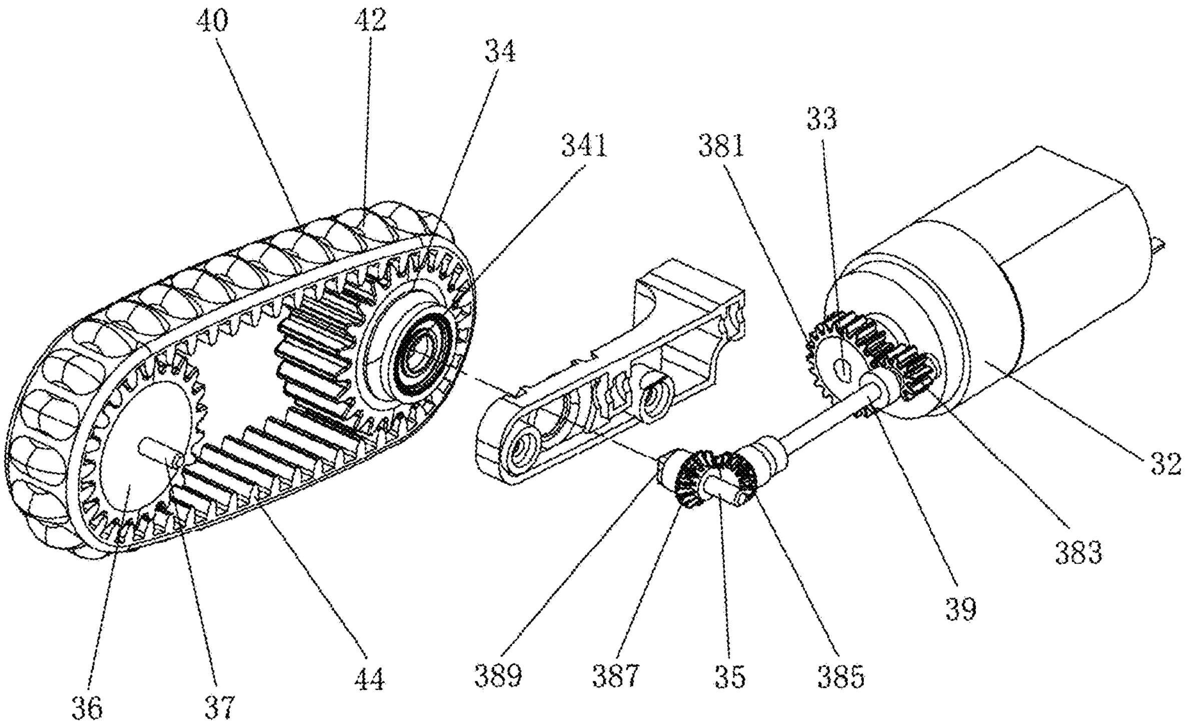
FIG. 7 is a further exploded view of the massage device shown in FIG. 5.

As shown in FIGS. 5-7, the massage member 40 is shaped like an annular belt, and specifically, shaped like an elliptical caterpillar belt. An outer circumferential surface of the massage member 40 is provided with a plurality of protrusions 42, which extend outwardly from the moving space 22 of the shell 20 to contact the rectum wall/vaginal wall directly, further improving the stimulation effect on the rectum wall or the vaginal wall. The protrusions 42 may be convex points, convex pillars, convex strips, convex ribs, etc., distributed at intervals along a circumferential direction of the massage member 40. In this embodiment, the protrusions 42 are shaped as elongate convex ribs.

Figure 8:
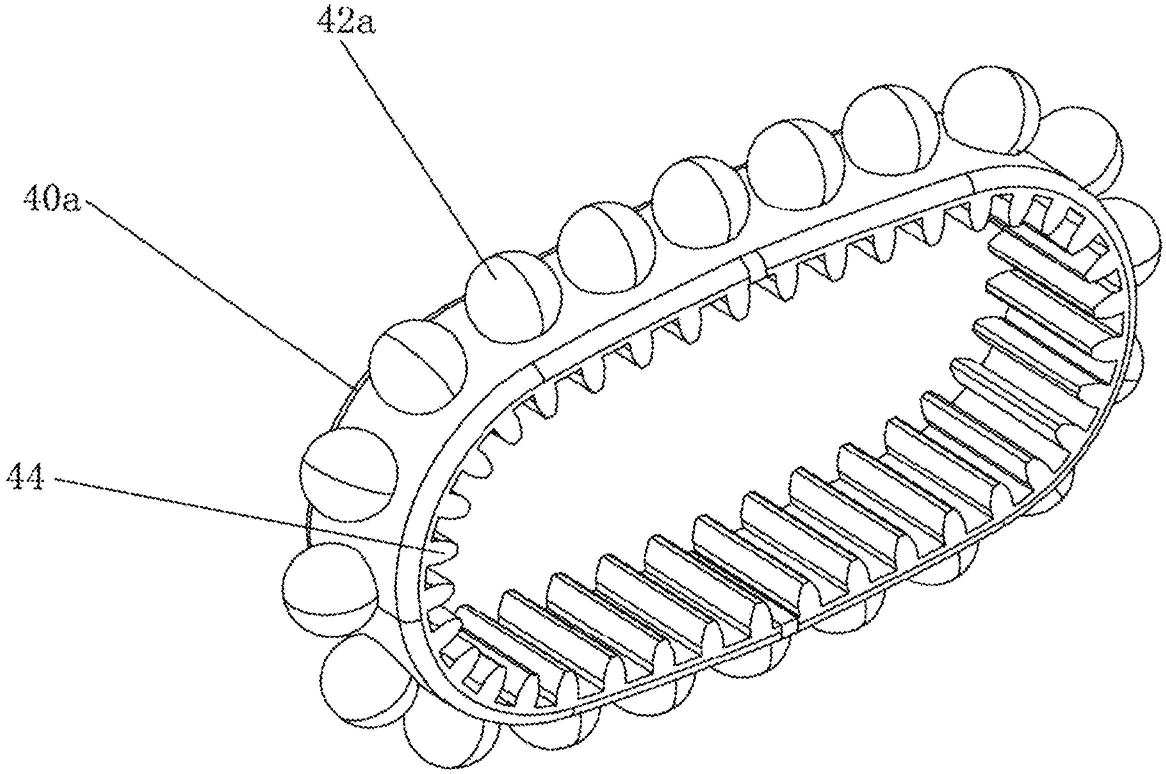
FIG. 8 is a first alternative use of the massage member.
Figure 9:
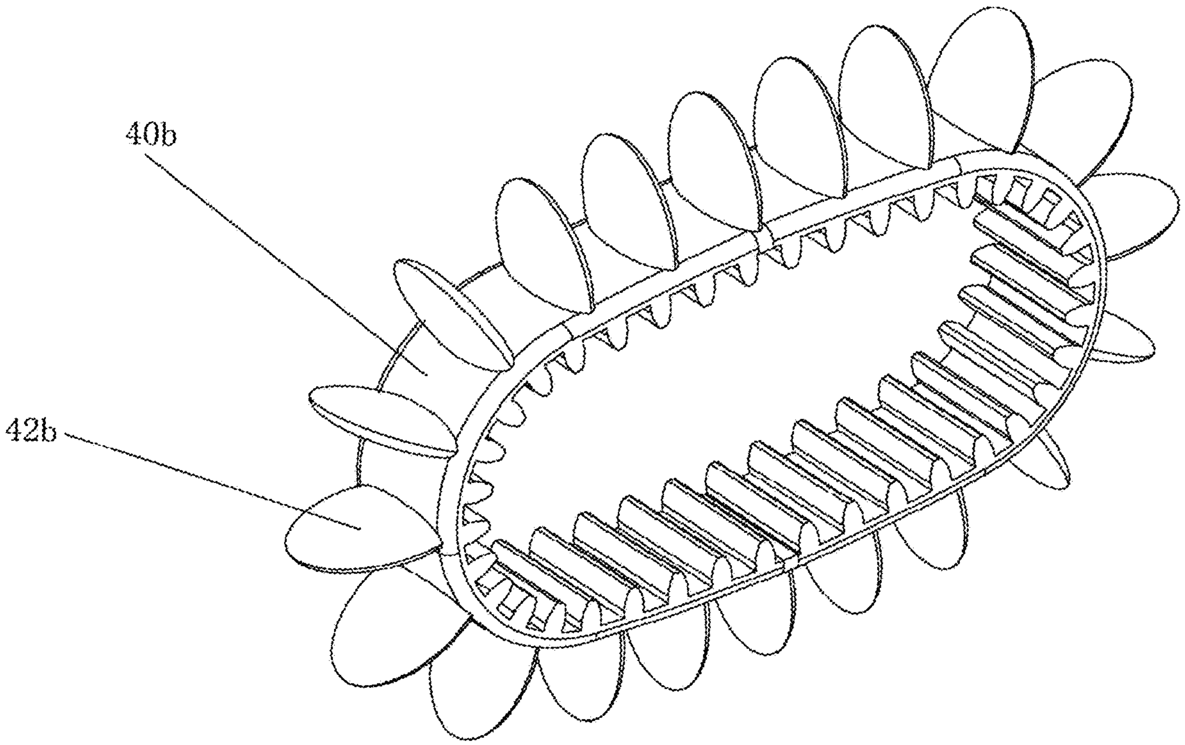
FIG. 9 is a second alternative use of the massage member.
Figure 10:
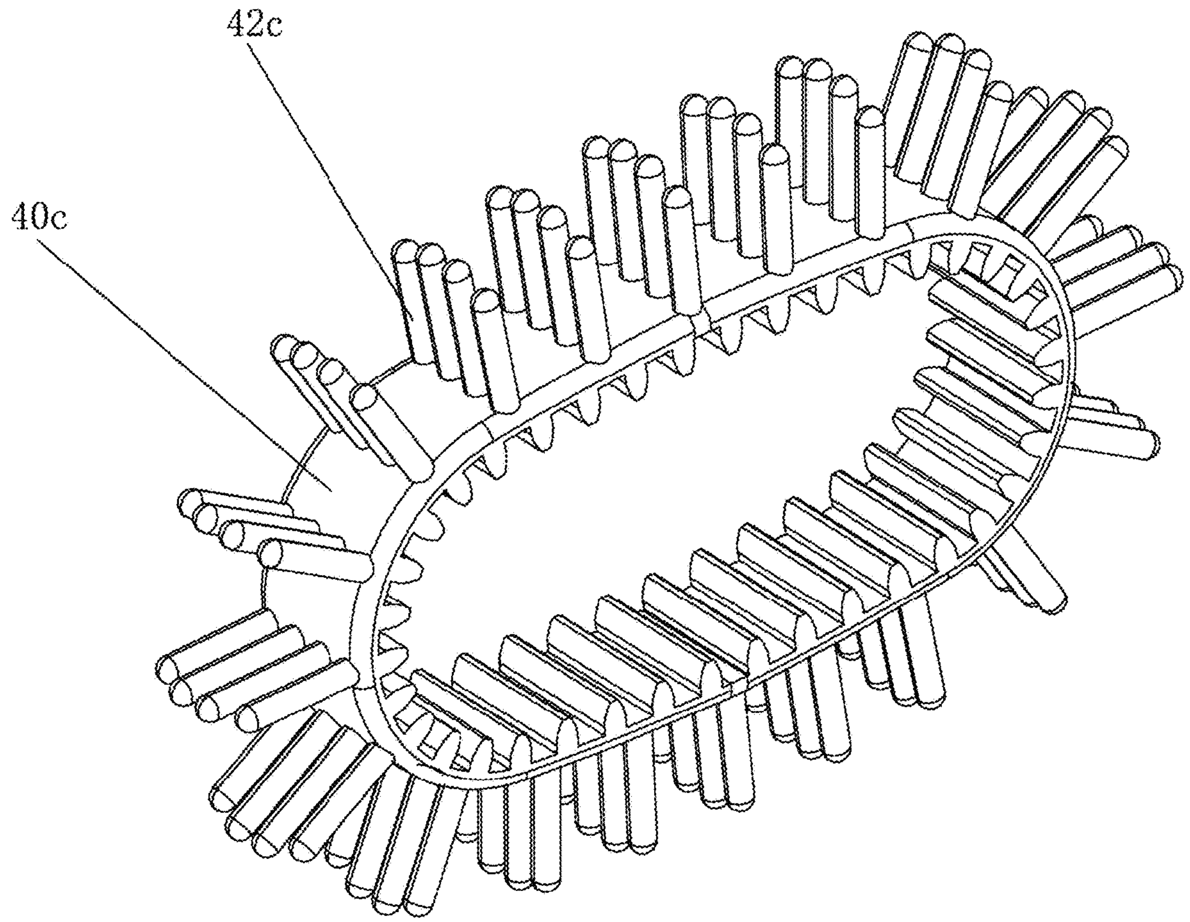
FIG. 10 is a third alternative use of the massage member.

FIGS. 8-10 show alternative embodiments of the massage member. As shown in FIG. 8, the massage member **40*a* has a plurality of protrusions 42*a* shaped like balls provided on its outer circumferential surface. As shown in FIG. 9, the protrusions 42*b* of the massage member 40*b* are shaped like arc sheets. As shown in FIG. 10, the protrusions 42*c* of the massage member 40*c*** are shaped like pillars. It should be noted that the protrusions are designed for enhancing the stimulation effect, and may be modified according to needs and should be limited to the specific embodiments.

As shown in FIGS. 5-7, the driving assembly 30 includes a driving motor 32, a driving wheel 34 connected to the driving motor 32, and a driven wheel 36 that cooperates with the driving wheel 34. As shown in FIG. 4, the driving motor 32 is set in a rear portion of the shell 20, while the driving wheel 34 and the driven wheel 36 both are received in the moving space 22. The massage member 40 is mounted around and engaged with the driving wheel 34 and the driven wheel 36. During use, the driving motor 32 drives the massage member 40 to rotate in the moving space 22 through the driving wheel 34 and the driven wheel 36.

Figure 2:
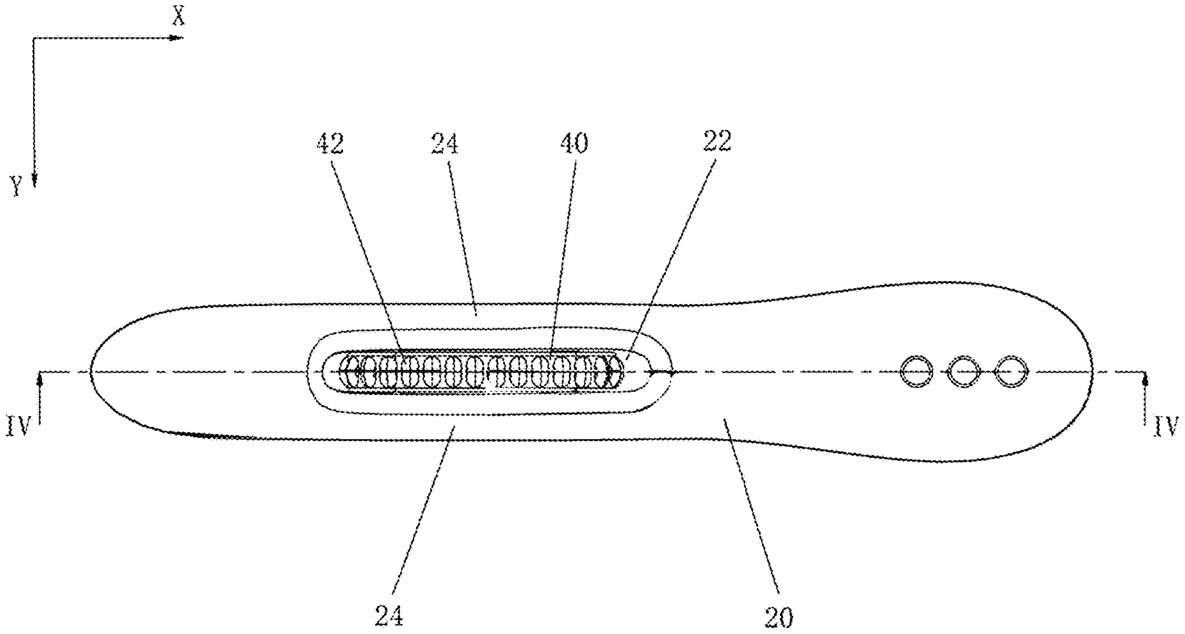
FIG. 2 is a top plan view of the massage device of FIG. 1.

As shown in FIG. 2 and FIG. 5, the moving space 22 is generally closed in its circumferential direction, and the shell 20 forms two support arms 24 at left and right sides, of the moving space 22, respectively. The driving wheel 34 and the driven wheel 36 are arranged side by side in the X-direction, wherein the driving wheel 34 is set adjacent to a rear end of the moving space 22, and is pivotally connected to the support arms 24 by a first shaft 35; and, the driven wheel 36 is set adjacent to a front end of the moving space 22, and is pivotally connected to the support arms 24 by a second shaft 37.

In this embodiment, the first shaft 35 and the second shaft 37 both extend laterally, such as along Y-direction. The first shaft 35 may be formed separately and then connected to the shell 20 and the driving wheel 34. The second shaft 37 may be formed separately and then connected to the shell 20 and the driven wheel 36. Alternatively, the first shaft 35 may be integrally formed with the shell 20 or the driving wheel 34; and/or, the second shaft 37 may be integrally formed with the shell 20 or the driven wheel 36.

In this embodiment, the driving wheel 34 and the driven wheel 36 both are gears, and an inner circumferential surface of the massage member 40 has a plurality of teeth 44 provided thereon, which are evenly spaced along the circumferential direction of the massage member 40 and mesh with the driving wheel 34 and the driven wheel 36. In this way, when the driving motor 32 drives the driving wheel 34 to rotate, the driving wheel 34 drives the massage member 40 engaged with it to rotate, and the massage member 40 drives the driven wheel 36 engaged with it to rotate, so that the massage member 40 can rotate continuously.

A transmission unit, such as a gear unit 38, is provided between the driving motor 32 and the driving wheel 34. As a transmission mechanism, the gear unit 38 can not only transmit the torque from the driving motor 32 to the driving wheel 34, but also change the direction of torque transmission as needed. In a specific embodiment, as shown in FIGS. 6-7, the gear unit 38 includes a first gear 381, a second gear 383, a third gear 385, and a fourth gear 387.

Among them, the first gear 381 is mounted around a shaft 33 of the driving motor 32, and the two are preferably arranged coaxially; the second gear 383 meshes with the first gear 381, preferably with a diameter smaller than that of the first gear 381; the third gear 385 and the second gear 383 are arranged coaxially, and the two can be connected integrally; the fourth gear 387 meshes with the third gear 385, preferably the third gear 385 and the fourth gear 387 both are bevel gears. The driving wheel 34 is coaxial with the fourth gear 387, wherein the diameter of the driving wheel 34 is greater than the diameter of the fourth gear 387.

By matching of the two bevel gears 385 and 387, a 90-degree change in the direction of torque transmission can be achieved, and thus the axial direction of the driving wheel 34 may be perpendicular to the shaft 33 of the driving motor 32. Through the gear unit 38, the torque transmission direction can be changed and long-distance deceleration torque transmission can be achieved.

After the high-speed rotation of the driving motor 32 is decelerated step by step, the driving wheel 34 is driven to rotate at an appropriate speed, thereby driving the massage member 40 to rotate at an appropriate speed. In the illustrated embodiment, the driving motor 32, the first gear 381, and the second gear 383 are set inside the rear portion of the shell 20, and the third gear 385 and the fourth gear 387 are accommodated in one of the support arms 24 of the shell 20. The third gear 385 is connected to the second gear 383 through an elongated rod 39, allowing the driving wheel 34 to be arranged in the moving space 22.

In this embodiment, a non-circular shaped, such as square-shaped, connecting hole 341 is defined in the center of the driving wheel 34, and the fourth gear 387 extends outward to form a connecting portion 389. The connecting portion 389 is inserted into the connecting hole 341 and fixed in a circumferential direction through shape matching. In this way, the fourth gear 387 can drive the driving wheel 34 to rotate synchronously. It should be understood that the fourth gear 387 may be assembled to the driving wheel 34 in other ways, as long as it can drive the driving wheel 34 to rotate.

It should be understood that the quantity, structure, size, etc. of the gears in the gear unit 38 may be adjusted as needed. In addition, other transmission mechanisms, such as worm gears, pulleys, etc., or a combination of multiple transmission mechanisms may be provided between the driving motor 32 and the driving wheel 34. That is, the transmission mechanism between the driving motor 32 and the driving wheel 34 is not limited to the gear transmission shown in the drawings. Furthermore, in some embodiments, the driving motor 32 may drive the driving wheel 34 to rotate directly, omitting the transmission mechanism.

In this embodiment, the rear portion of the shell 20 is configured as a handle of the massage device 100, and function buttons 52 are provided on an outer wall of the handle. In the handle, a control circuit board 54 is provided, which connects electrically to the vibration motor 50, the driving motor 32, the buttons 52 and other electronic components to form a control circuit. The users may control the operation of the present massage device, such as control the direction and speed of the driving motor 32, control the vibration frequency of the vibration motor 50 inside the front portion of the shell 20, and etc. through the buttons 52 on the handle of the shell 20.

Further, a battery 56, which is preferably a rechargeable battery, is provided inside the handle of the shell 20. The battery 56 is electrically connected to the control circuit board 54 serves as the power source for the whole massage device 100.

During use, the users may start only the drive motor 32 or the vibration motor 50, or start both the drive motor 32 and the vibration motor 50 simultaneously, so that the users can experience different stimulation effects according to actual needs. Compared with the existing massage devices, the massage device according to the embodiments of the present application generates a kneading effect on the human body through the rotation of the massage member, which has an enlarged stimulation range and better stimulation effect. Thus, the users are more likely to reach orgasm with the help of the present massage device.

In a specific embodiment, the shell 20 is a double-layer structure, including an inner shell 26 and an outer shell 28 that covers the inner shell 26. The inner shell 26 may be made of hard materials, such as plastic, alloy and the like. A space for installing the driving assembly 30, the control circuit board 54, the battery 56, and etc. is defined inside the inner shell 26. The outer shell 28, which is the outermost layer of the entire massage device 100, may be made of soft materials, such as silicone, rubber and the like, providing a soft touch when it is inserted into the human body.

During production, firstly, the driving motor 32, the vibration motor 50, the control circuit board 54, the battery 56, and etc. may be assembled within the inner shell 26, and then together placed into a mold to form the outer shell 28 through over-molding. The outer shell 28 integrally formed on the inner shell 26 not only simplifies production and assembly, but also improves the overall sealing performance of the massage device 100. In addition, the integral outer shell 28 plays a waterproof and dustproof role, facilitating the cleaning and storage of the present massage device 100.

The massage member 40, as a component that directly interacts with the human body, can be made of soft materials such as silicone and rubber, providing a soft touch when in contact with the human body.

In a specific embodiment, the massage member 40 may be a double-layer structure, including an inner belt **40*a* and an outer belt 40*b* around the inner belt 40*a*. The outer belt 40*b* may be made of soft materials such as silicone and rubber, and the inner belt 40*a* may be made of hard materials such as plastic and alloy. The teeth 44 extend inwardly and integrally from an inner circumferential surface of the inner belt 40*a*, so that they have sufficient strength to form effective torque transmission with the driving wheel 34. The protrusions 42 extend outwardly and integrally from an outer circumferential surface of the outer belt 40*b***, allowing them to directly contact and avoiding unnecessary damage to the human body.

In this embodiment, the massage member 40 may be partially received in the moving space 22 of the shell 20, and partially mounted around the front portion of the shell 20, wherein the front portion of the shell 20 is at a front side of the moving space 22 and configured to be inserted into the rectum or the vagina of the human body. In this case, the driving wheel 34 is mounted inside the front portion of the shell 20, and the driven wheel 36 is accommodated inside the moving space 22 of the shell 20. In this way, stimulation to the deep in the vagina or the deep in the rectum may be enhanced.

Second Embodiment

As shown in FIGS. 11-22, which show a massage device 200 of the second embodiment of the present disclosure. The massage device 200 is capable of being inserted into a human body to provide multi-stimuluses to the user. The massage device 200 includes a main massage portion 1 most of which is inserted into the human body, for example, a vagina, a vice massage portion 2 extending from the main massage portion 1, a massage member 40 located in the main massage portion 1, a driving assembly 30 configured to control the main massage portion 1 and/or other massage functions of the massage device 200, and an inner shell 26 configured to receive function elements, such as the driving assembly 30 of the massage device 200.

In an exemplary embodiment of the present disclosure, the length of the vice massage portion 2 is shorter than that of the main massage portion 1. It can be understood that the length relationship and/or length ratio between the main massage portion 1 and the vice massage portion 2 are adjustable.

The main massage portion 1 includes a head portion 10, a connecting portion 11 and a handle 12. The head portion 10 is configured to be inserted into the vagina along an insertion direction X so as to provide a first stimulus to a first area of the vagina. The first stimulus can be for example a sensation of stimulation generated by at least one of friction, tapping, or vibration applied on the object to be contacted. In one example embodiment, the frictional motion generated by the action of inserting or withdrawing from the body forms the first stimulus. The connecting portion 11 connects the head portion 10 and the handle 12. The connecting portion 11 comprises a sub-massage portion 111 configured to provide a second stimulus to the object to be contacted. The massage member 40 corresponds to the sub-massage portion 111, and reciprocally and linearly moves with respect to the main massage portion 1 under the control of the driving assembly 30. In one example embodiment of the present disclosure, the massage member 40 performs synchronous or asynchronous linear movement following with the movement of the head portion 10. Referring also FIG. 4, when the massage member 40 is inserted into the human body, the sub-massage portion 111 is also inserted into the human body, and then provides a second stimulus to the body, the second stimulus is generated by the linear movement of the massage member 40.

The handle 12 includes a handle housing 121 and several control items located therein. The driving assembly 30 is correspondingly received into a cavity 1211 (as shown in FIG. 5) defined by the handle housing 121. In one exemplary embodiment of the present disclosure, the handle housing 121 is a part of the inner shell 26, and is integrated formed with other portions of the inner shell 26. A through opening 1212 (as shown in FIG. 2) is defined in a wall of the handle housing 121 facing towards the connecting portion 11. A transmission function element of the driving assembly 30 is connected to the massage member 40 via the through opening 1212, thereby the driving assembly 30 drives the massage member 40 to move. The inner shell 26 comprises two support arms 24 extended from two opposite edges of a top end of the handle housing 121 along the length direction of the main massage portion 1. The length direction is parallel to the insertion direction X. The two support arms 24 are arranged at an interval. A hollow space 241 is defined between the two support arms 24. The hollow space 241 is also formed by a recess penetrates through the inner shell 26 in a thickness direction of the inner shell 26 perpendicular to the length direction, thereby forming a first opening 231 and a second opening 233 opposite to the first opening 231. Both the first opening 231 and the second opening 233 are communicated with the hollow space 241, and are intercommunicating the hollow space 241 inside the inner shell 26 with an outside environment space out of the inner shell 26. In some exemplary embodiments of the present disclosure, the hollow space 241 can be for example a recess formed in the inner shell 26 by inwardly depressed in the thickness direction of the inner shell 26 without penetrating through the inner shell 26, and the recess includes side walls defined by the two support arms 24, a bottom wall (not labeled) defined by the remained shell and an opening (e.g. the first opening 231) communicating with the hollow space 241.

The massage member 40 is received in the hollow space 241 and is capable of linearly reciprocally moving with respect to the main massage portion 1 under the control of the driving assembly 30, and at least a portion of a massage surface 45 of the massage member 40 is capable of protruding out of the inner shell 26 via at least one of the first opening 231 and the second opening 233. When the massage member 40 performs the linearly reciprocally movement in the length direction, the massage surface 45 repeatedly applies pressure or simulation to different positions of a specific area of the object being contacted following with the movements of the massage member 40.

A gap 243 is formed between the inner wall of the two support arms 24 and the outer wall of the massage member 40, thereby the massage member 40 does not contact the inner sidewalls of the two support arms 24.

Figure 16:
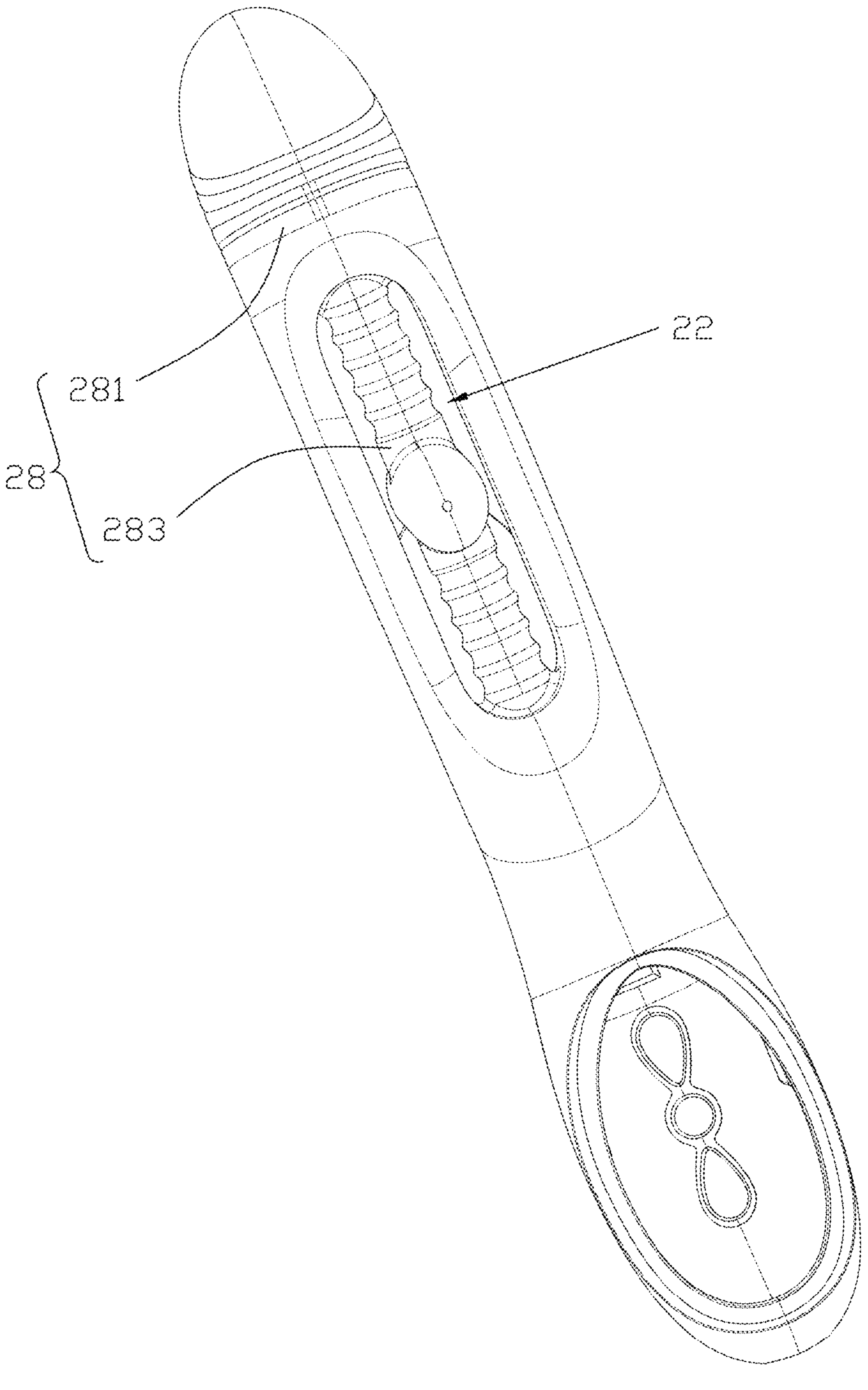
FIG. 16 is a perspective view of the outer shell of the massage device according to the second embodiment of FIG. 11.
Figure 17:
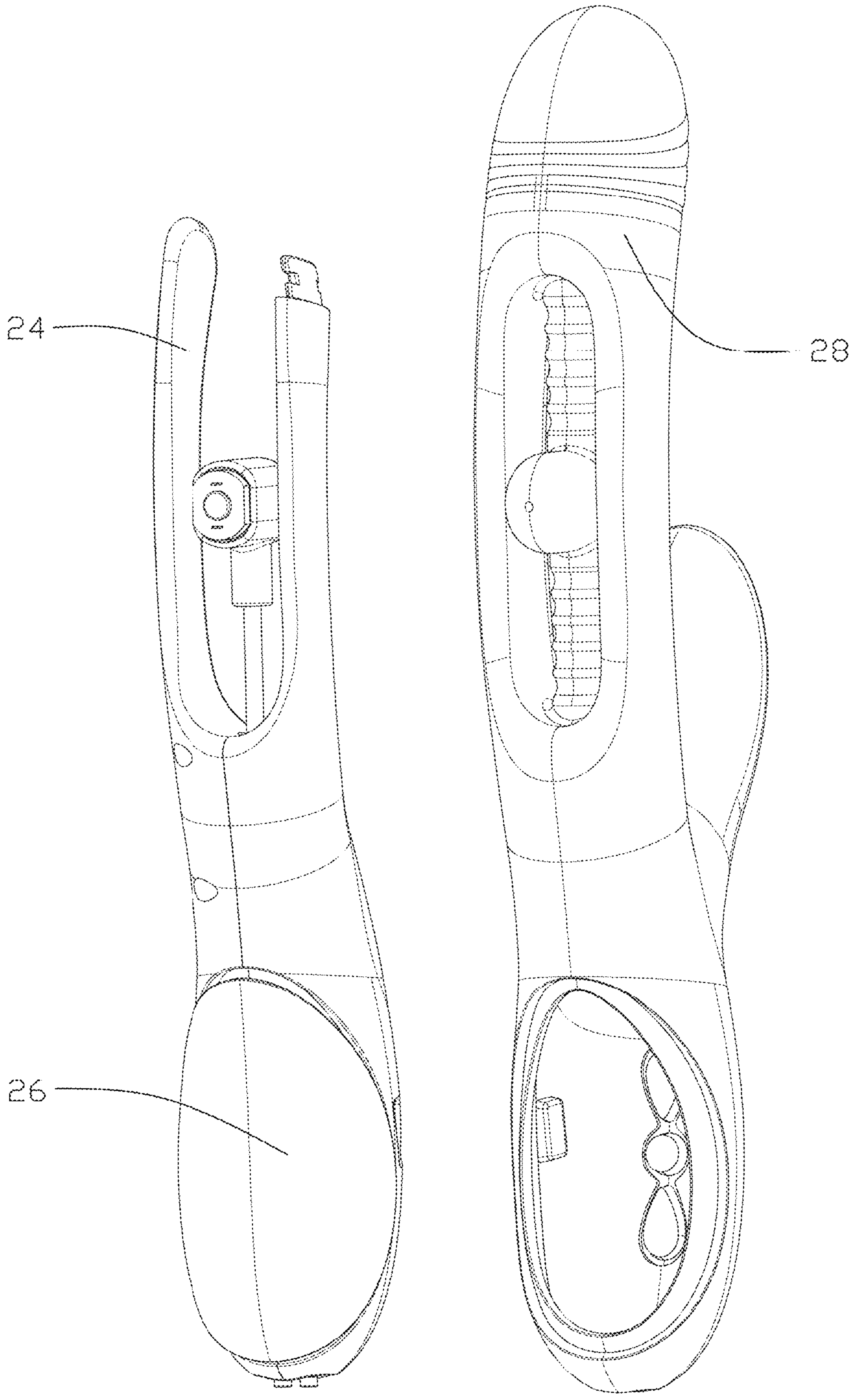
FIG. 17 is an exploded view of the outer shell and an inner shell of the massage device according to the second embodiment of FIG. 11.

Referring to FIG. 16 and FIG. 17, an outer shell 28 made of flexible material with elasticity covers outer surfaces of the inner shell 26 except the first opening 231 and the second opening 233, thereby the first opening 231 and the second opening 233 are communicated with an outside environment space out of the inner shell 26. In some exemplary embodiments of the present disclosure, the side of the outer shell 28 close to the head portion 10 forms a moving space 22 defined by the hollow space 241. The moving space 22 is a long arc-shaped hole. The massage member 40 is installed within the moving space 22 and can move reciprocally with respect to the inner shell 26. In this embodiment, the outer shell 28 completely covers the two support arms 24 but does not cover the upper and lower sides of the hollow space 241, thereby the moving space 22 and the hollow space 241 coincide.

The outer shell 28 covers the main massage portion 1, the massage member 40 and the vice massage portion 2 to play a waterproof role. The inner shell 26 is made of solid material, and the outer shell 28 is provided with a first cover 281 and a second cover 283. The second cover 283 is installed telescopically within the hollow space 241 and covers the items in the hollow space 241. The first cover 281 is used for covering the massage device 200 expect the items in the hollow space 241. The sliding motion of the massage member 40 drives the second cover 283 to telescopically move with respect to the inner shell 26. The ends of the massage member 40 protruding the inner shell 26 are covered by the outer shell 28, and the outer shell 28 is curved structure. one end of the second cover 283 is fixed to the handle housing 121 of the inner shell 26 and covers the extension bar 65 and the massage member 40. The other end of the second cover 283 is connected to the bottom of the head portion 10 The second cover 283 is a folding structure. Further, in the first direction X of the inner shell 26, when the massage member 40 moves from the handle 12 towards the head portion 10, the portion of the second cover 283 close to the head portion 10 is compressed, while the portion far from the head portion 10 is stretched. When the massage member 40 moves from the head portion 10 towards the handle 12, the portion of the second cover 283 far from the head portion 10 is compressed, while the portion close to the head portion 10 is stretched, so as to move telescopically follow the massage member 40.

Figure 18:
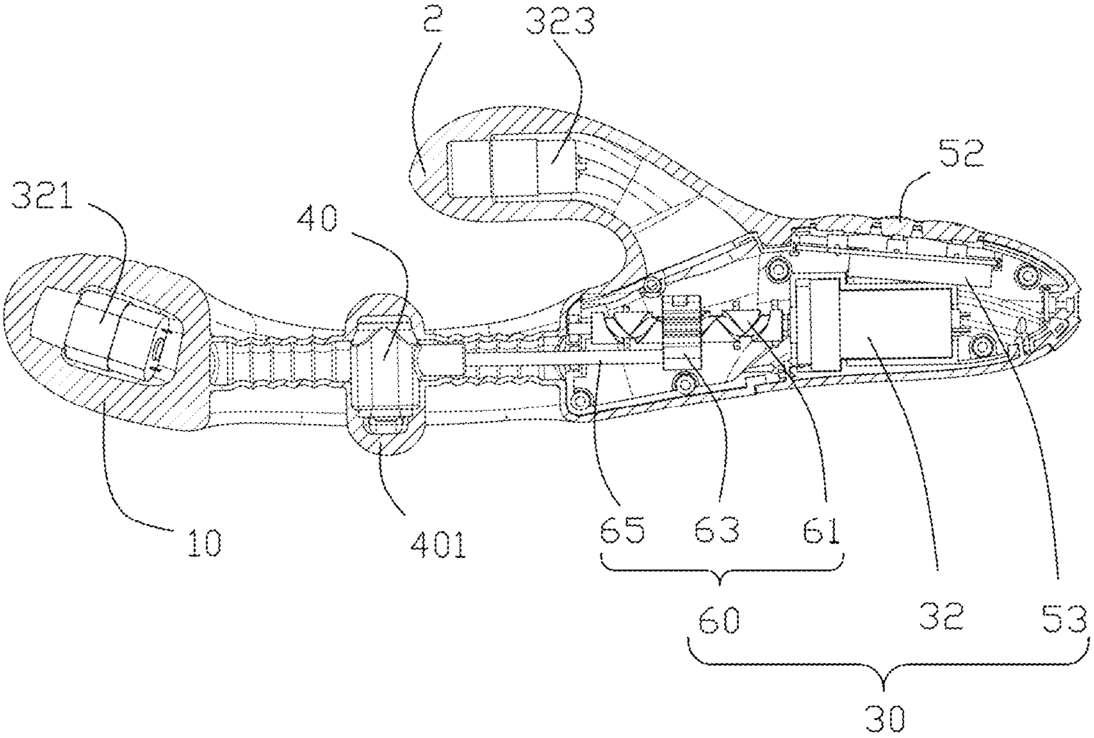
FIG. 18 is a cross-sectional view of the massage device according to the second embodiment of FIG. 11.

Referring to FIG. 18, the inside of the inner shell 26 forms various brackets protruding with respect to the inner wall of the inner shell 26 and the brackets are used for fixing the positions of the driving assembly 30, a control circuit board 54 and others. The inner shell 26 is made of hard material, so as to improve the bracing stability, enhance durability and extend the service life of the massage device 200. The back end of the shell far from the head portion 10 is provided with a function buttons 52. The function buttons 52 is in direct connected to the control circuit board 54 and used to control the massage device 200. It can be understood that the preferred position of the function buttons 52 is at the back end of the massage device 200 to avoid being far from the battery, thus reducing current transmission loss. It can be understood that the positions of the function buttons 52 are adjustable, or it can be replaced by a remote device or electronic product for control.

Furthermore, the inner shell 26 is made of a first material, the massage member 40 is made of a second material and the outer shell 28 is made of a third material. The elasticity of the first material is less than the second material and the elasticity of the third material is more than the second material.

Referring to FIG. 12, FIG. 15, FIG. 18 and FIG. 19, the driving assembly 30 is installed within the cavity 1211 of the inner shell 26. The driving assembly 30 includes a driving motor 32, the control circuit board 54 and a transmission mechanism 60. A portion of the transmission mechanism 60 extending and protruding towards the hollow space 241 through the through opening 1212 and connecting to the massage member 40. The slide of the massage member 40 in the hollow space 241 is performed by the coordinate between the transmission mechanism 60 and the driving motor 32.

The driving motor 32 is fixedly installed within the cavity 1211, with an elongated shaft 33 extending from one end of the driving motor 32, used for installing the transmission mechanism 60.

The transmission mechanism 60 includes a screw 61, a sliding block 63 and the extension bar 65. The screw 61 has a perforation 613 in the length direction. The shaft 33 is inserted into one end of the perforation 613 and extends through the other end of the perforation 613, so that the screw 61 is sleeved on the shaft 33. The shaft 33 keeps rotating, driven by the driving motor 32, while drives the screw 61 to rotate. The sliding block 63 is movably sleeved on the screw 61. One end of the extension bar 65 connected to the sliding block 63 and the other end extends towards the hollow space 241 through the through opening 1212 until it is connected to the massage member 40. In some exemplary embodiments of the present disclosure, the extension bar 65 and the screw 61 are parallel to each other and arranged at an interval.

Figure 19:
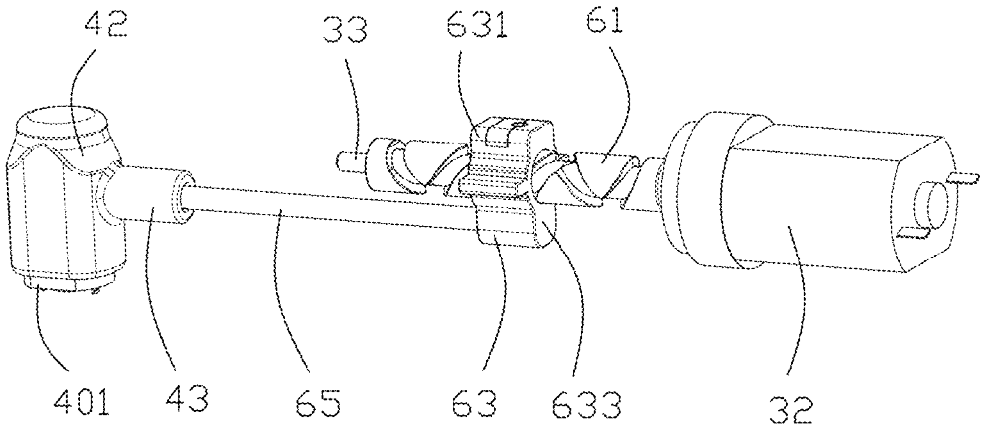
FIG. 19 is a perspective view of a partial structure of the massage device according to the second embodiment of FIG. 11.
Figure 20:
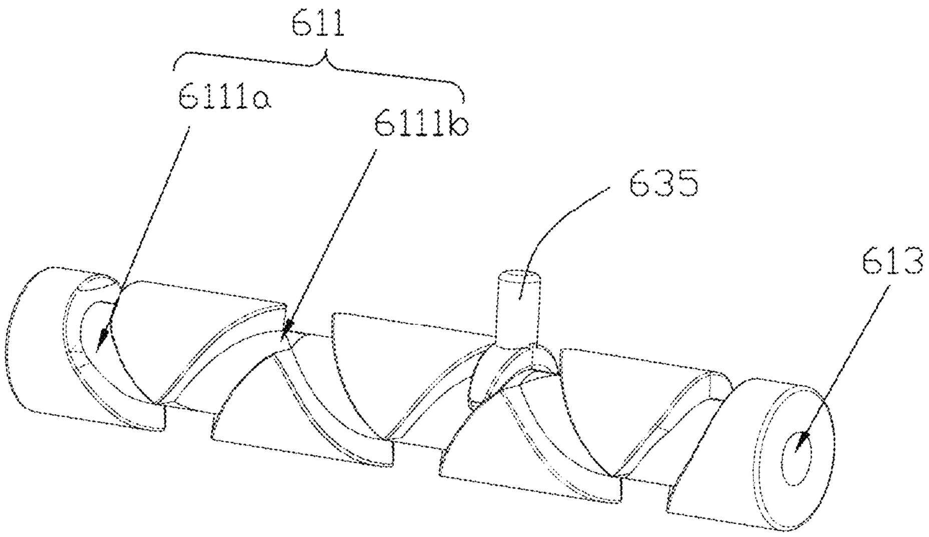
FIG. 20 is a schematic diagram of a matching relationship between a screw and a plug of the massage device according to the second embodiment of FIG. 11.

Referring to FIG. 19 and FIG. 20, the screw 61 is a long and hollow cylindrical tube with a circular cross-section. The screw 61 along the length direction forms a spiral sliding groove 611. The shaft 33 keeps rotating, driven by the driving motor 32, while drives the screw 61 to rotate. At this time, the sliding block 63 can move forward along the sliding groove 611 from the end of the screw 61 close to the driving motor 32 towards the end of the screw 61 far away from the driving motor 32, or can move backward along the sliding groove 611 from the end of the screw 61 far away from the driving motor 32 towards the end of the screw 61 close to the driving motor 32, so that the sliding block 63 reciprocating move with respect to the screw 61 through the sliding groove 611. The sliding groove 611 consists of multiple inclined chutes 6111. The adjacent two inclined chutes 6111 are in a V-shaped and the two separated inclined chutes 6111 are parallel to each other, so that the adjacent three inclined chutes 6111 are in an incline N-shaped. It can be understood that the specific structure of the sliding groove 611 can be designed according to actual demands.

Figure 21:
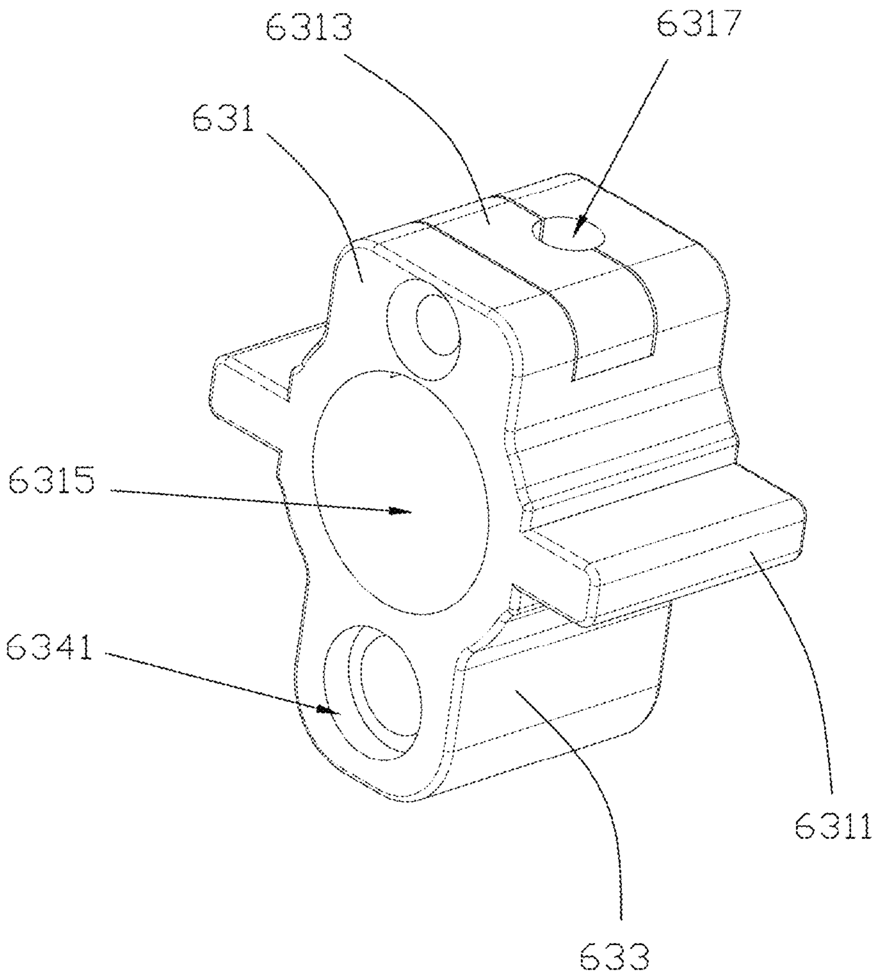
FIG. 21 is a perspective view of a sliding block of the massage device according to the second embodiment of FIG. 11.
Figure 22:
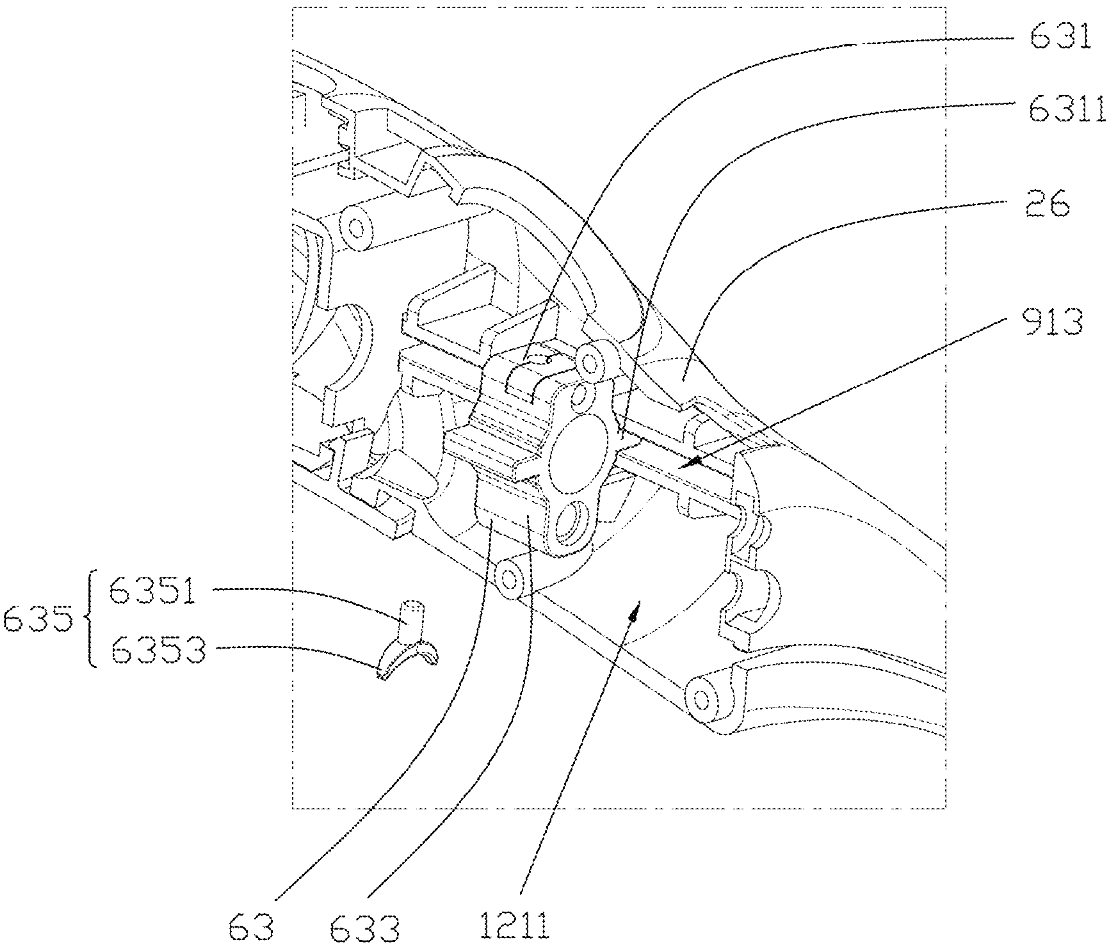
FIG. 22 is a schematic diagram of a matching relationship between the sliding block and the inner shell of the massage device according to the second embodiment of FIG. 11.

Referring to FIG. 19, FIG. 21 and FIG. 22, the sliding block 63 is rectangular and includes a first portion 631 and a second portion 633 extending and protruding from the first portion 631. The first portion 631 is connected to the screw 61 and the second portion 633 is connected to the extension bar 65. The first portion 631 and the second portion 633 are integrally formed structure. The middle of the first portion 631 defines a first through hole 6315, which through the first portion 631 in the length direction. The screw 61 inserted into the first through hole 6315, so that the sliding block 63 is sleeved on the screw 61. The top of the first portion 631 far away from the second portion 633 defines a second through hole 6317, and the second through hole 6317 is connected to the first through hole 6315. A limiting block 6313 and a plug 635 installed on the second through hole 6317. The limiting block 6313 contacts the plug 635, thereby the limiting block 6313 prevents the plug 635 from moving in the second through hole 6317. A portion of the plug 635 is accommodated in the second through hole 6317 and contacted the sliding block 63. The other portion of the plug 635 is extended to the first through hole 6315 through the second through hole 6317 and contacted the sliding groove 611.

The plug 635 includes a cylindrical rotating end 6351 that can rotate in the second through hole 6317 and an arc sliding end 6353. The rotating end 6351 and the sliding end 6353 are integrally formed structure. The sliding end 6353 in direct engaged in the sliding groove 611. The radian of the sliding end 6353 and the sliding groove 611 are equal, that is, the sliding end 6353 is completely conformed to the inner wall of the sliding groove 611. The two sides of the first portion 631 along the width direction extend and form a sliding vane 6311. The inner wall of the inner shell 26 extends inwards to form two protrusions at an interval. A sliding rail 913 is formed between the two protrusions. The upper wall and the lower wall of the sliding rail 913 are bonded to the sliding vane 6311, so that the upper wall and the lower wall limit the sliding vane 6311 to move up and down, and thus the sliding block 63 cannot move up and down with respect to the inner shell 26.

The middle of the second portion 633 defines a third through hole 6331, the opening of the third through hole 6331 is the same as the first through hole 6315. One end of the extension bar 65 is directly inserted into the third through hole 6331 so as to connect to the sliding block 63. The extension bar 65 and the screw 61 are parallel to each other and arranged at an interval.

Referring to FIG. 19, the massage member 40 is T-shaped and includes a protrusion 42 and a connecting portion 43 that extends from the protrusion 42. The connecting portion 43 is perpendicular to the protrusion 42. The connecting portion 43 is fixedly connected to the extension bar 65. Two ends of the protrusion 42 protrude outside the inner shell 26 through the hollow part, that is, the two ends of the protrusion 42 protrude outside the two support arms 24. Two ends of the protrusion 42 form at least one opening and fixedly install a second motor 401. The second motor 401 is a vibration motor. The second motor 401 can vibrate by operating the function buttons 52. Through the cooperation of the driving assembly 30 and the second motor 401, the massage member 40 can produce a vibration effect while sliding, thereby enhancing the massage experience for users. It can be understood that the vibration speed of the second motor 401 can be controlled by the function buttons 52. It can be understood that the driving assembly 30 and the second motor 401 are independent structures, which means that the massage member 40 can only slide, or only produce vibration, or produce vibration while sliding.

It can be understood that the massage member 40 can also be accommodated in the moving space 22 and does not protrude outside the inner shell 26. At this time, a portion of the second area of the vagina is inserted into the moving space 22 to contact to the massage member 40. When the massage member 40 reciprocating move in the moving space 22 with respect to the inner shell 26, the massage member 40 massages the second area of the vagina.

In other embodiments, the two ends of the massage member 40 respectively protrude from the two opening of the support arms 24 to protrude outside the inner shell 26. The second cover 283 envelopes the massage member 40. The second cover 283 is made of a flexible material with elasticity, thereby the second cover 283 that envelopes the ends of the massage member 40 is protruding. Furthermore, when the massage member 40 reciprocating move under the second cover 283 with respect to the inner shell 26, the second cover 283 does not prevent the massage member 40 from moving.

Referring to FIGS. 19-22, the principle of the massage member 40 sliding within the moving space 22 as follows.

The user operates the function buttons 52 to drive the driving motor 32. The driving motor 32 drives the shaft 33 to rotate clockwise or counterclockwise, and the shaft 33 drives the screw 61 to rotate. As the screw 61 rotating, the side wall of a first inclined chute 6111*a* extrudes the sliding end 6353 of the plug 635, so that the sliding end 6353 moves slowly towards a second inclined chute 6111*b*, and thus the position in the sliding groove 611 of the plug 635 is changed. The sliding vane 6311 is restricted by the sliding rail 913 and cannot move vertically, so that the plug 635 can only drive the screw 61 to slide horizontally along the screw 61. The sliding of the sliding block 63 drives the extension bar 65 to move horizontally, thereby causing the extension bar 65 to drive the massage member 40 to slide. When the sliding end 6353 of the plug 635 rotates from the first inclined chute 6111*a* to the last inclined chute 6111*n*, due to the constant rotation direction of the shaft 33, the plug 635 returns to the first inclined chute along the inclined chute 6111 on the other side of the sliding groove 611. The sliding block 63 drives the extension rod 65 to retract, thereby the massage member 40 reciprocating slide or performs reciprocal linear motions. It can be understood that the sliding speed of the massage member 40 can be controlled, and its sliding speed depends on the rotational speed of the shaft 33.

Furthermore, the transmission mechanism 60 can be driven by an externally applied force to rotate the plug 635, thereby changing the position of the plug 635 within the sliding groove 611.

Furthermore, the plug 635 and the screw 61 can rotate simultaneously, thereby changing the position of the plug 635 within the sliding groove 611.

Referring to FIG. 18, in this embodiment, the head portion 10 includes a first motor 321 and the vice massage portion 2 includes a third motor 323. Both the first motor 321 and the third motor 323 can produce vibration, thereby driving the head portion 10 and the vice massage portion 2 to produce vibration or swing at multiple angles. It can be understood that the first motor 321 and the third motor 323 are controlled independently of each other. It also can be understood that the number of the first motor 321 and the third motor 323 is not limited, and can be zero, one, or multiple.

In this embodiment, the tail end of the inner shell 26 provided with a charging port. The charging port is used to supply power to the driving motor 32 and the control circuit board 54. It can be understood that the power source of the massage device 200 can be an internal rechargeable battery or direct external power supply.

In this embodiment, the outer shell 28 completely covers the opposite sides of the two support arms 24, thereby forming the moving space 22 that overlaps with the hollow space 241. The massage member 40 can slide in the hollow space 241. The main massage portion 1, including head portion 10 and massage member 40, along with the vice massage portion 2, can simultaneously massage three different areas of the vagina, providing a wide massage area. Among them, the massage member 40 can reciprocating slide to massage through the driving assembly 30. The reciprocating sliding massage mode of the stimulating portion, combined with the vibration effect of the second motor, provides a better massage experience and is more practical.

Third Embodiment

A description is given next of a third embodiment. For the sake of convenience of explanation, parts identical to those in the foregoing second embodiment shown in FIG. 11 to FIG. 22 are denoted by identical reference signs and are not described again for brevity. This embodiment is different in structure of the second cover 283*a*.

Figure 11:
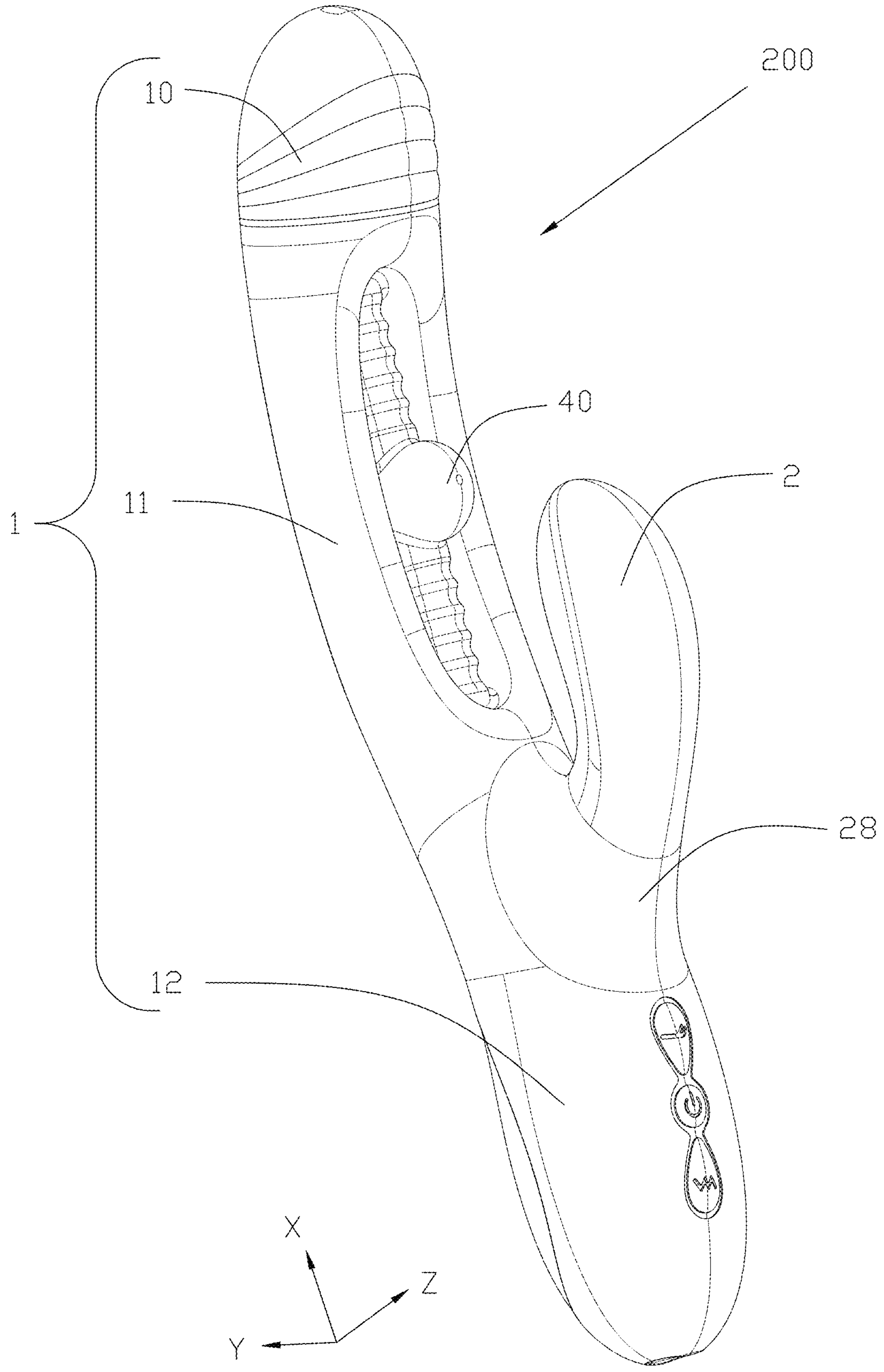
FIG. 11 is an isometric, assembled view of a massage device according to a second embodiment of the present disclosure, the massage device including a shell and a massage member.
Figure 12:
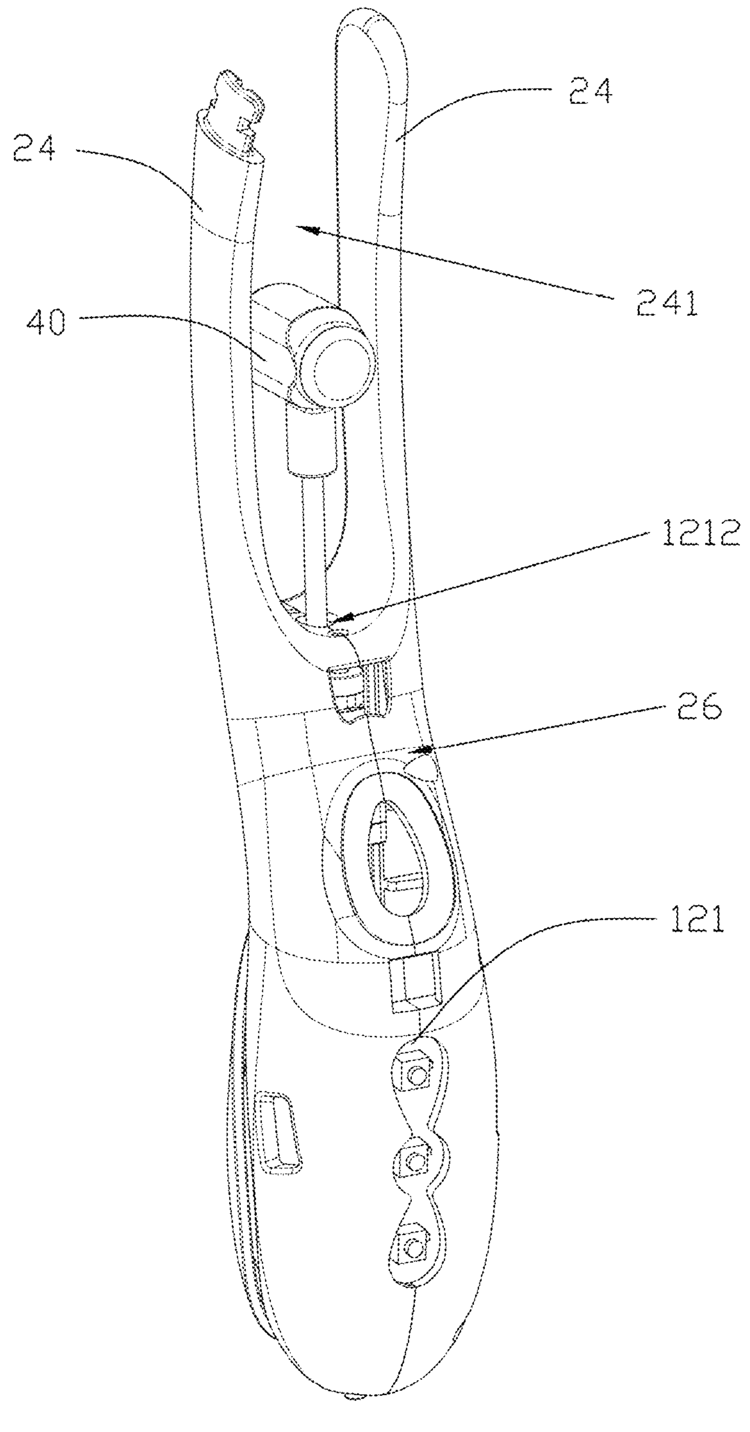
FIG. 12 shows a perspective view of the massage device after disassembling an outer shell from the massage device according to the second embodiment of FIG. 11.
Figure 13:
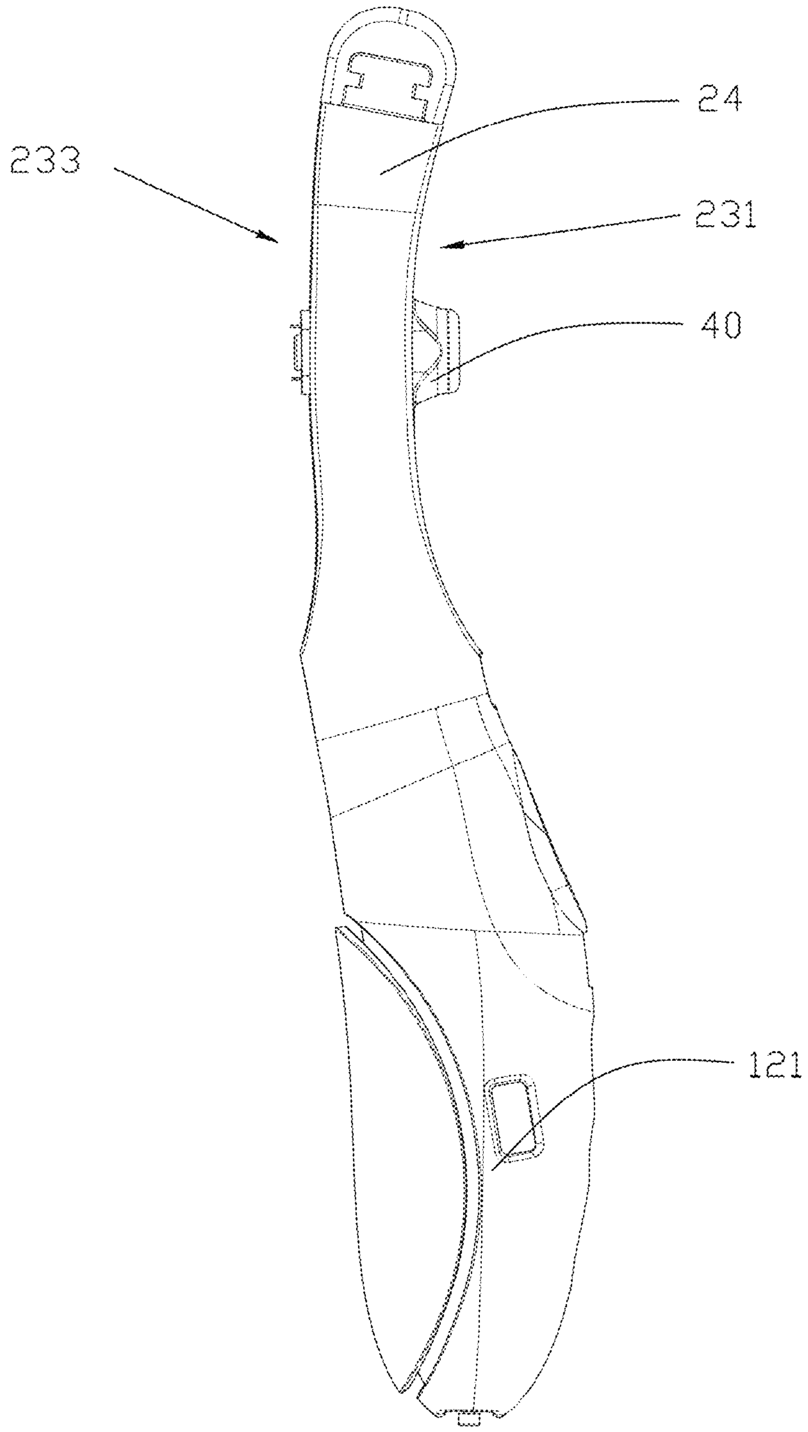
FIG. 13 is a side diagram view of the massage device after disassembling the outer shell according to the second embodiment of FIG. 11.
Figure 14:
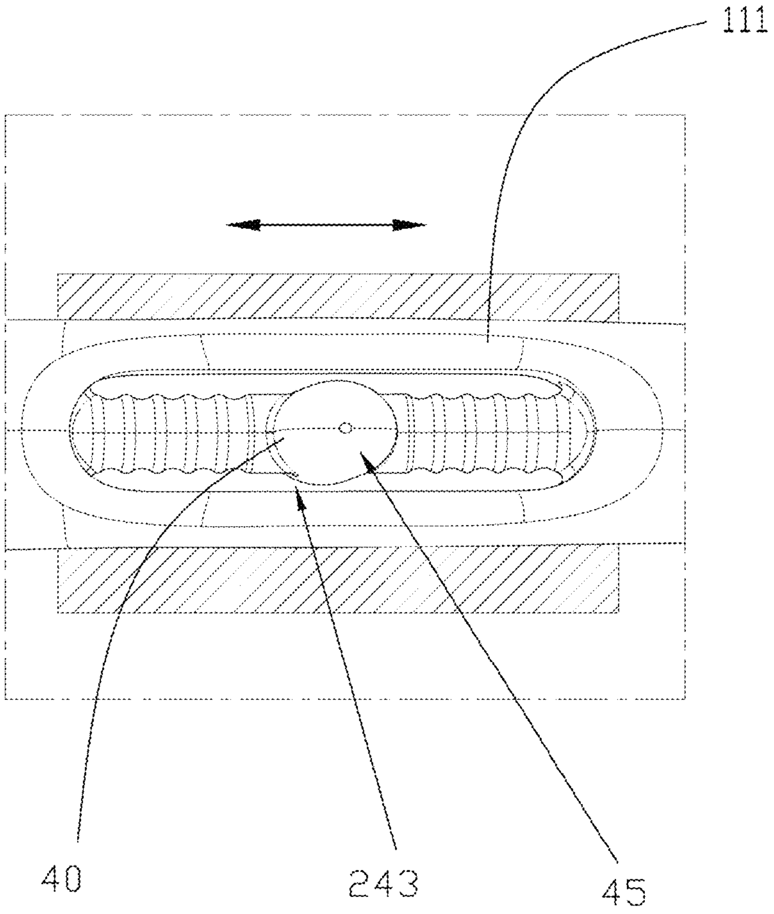
FIG. 14 illustrates a motion of the massage member according to the second embodiment of FIG. 11.
Figure 15:
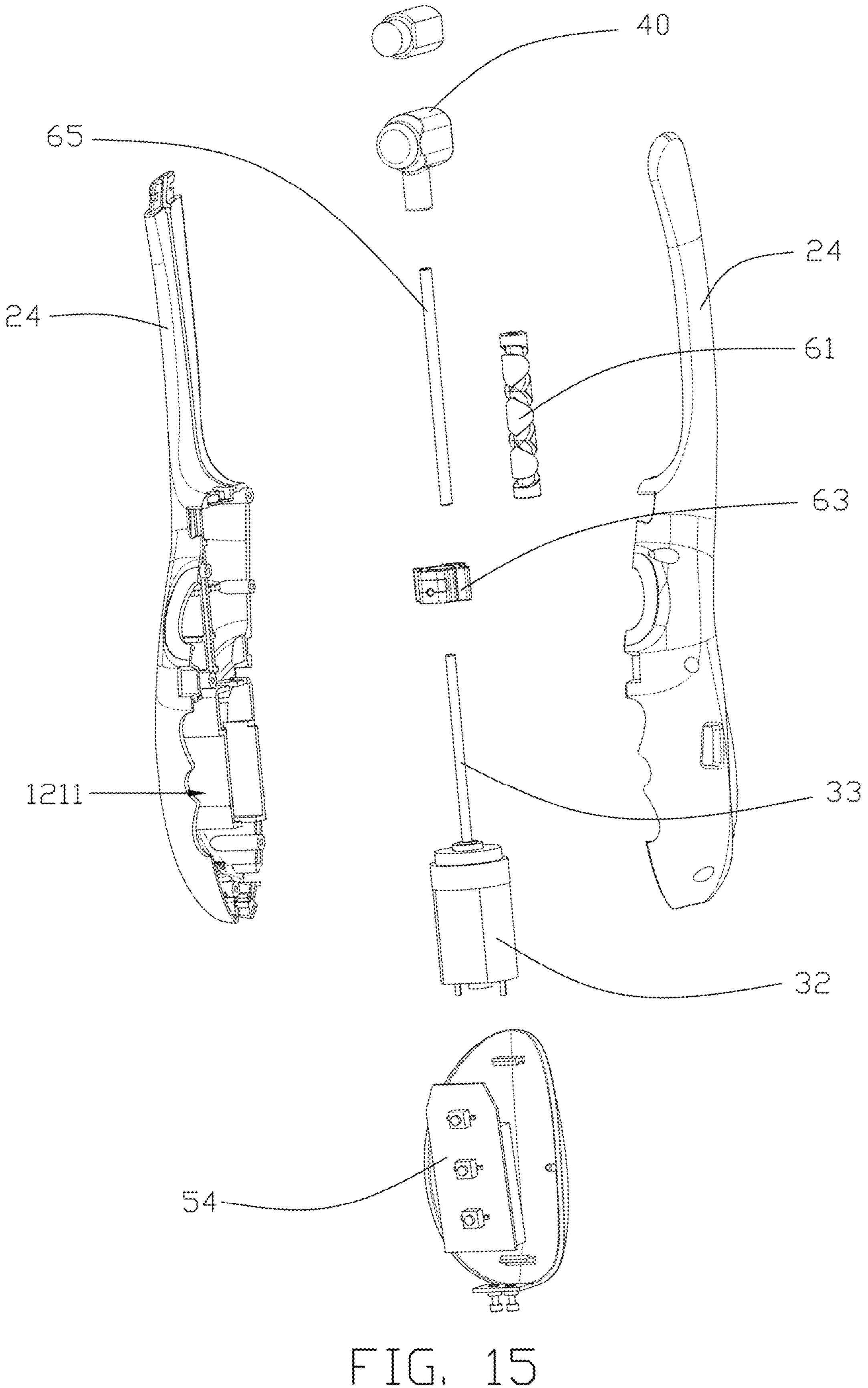
FIG. 15 is an exploded view of the massage device, after disassembling the outer shell, according to the second embodiment of FIG. 11.
Figure 23:
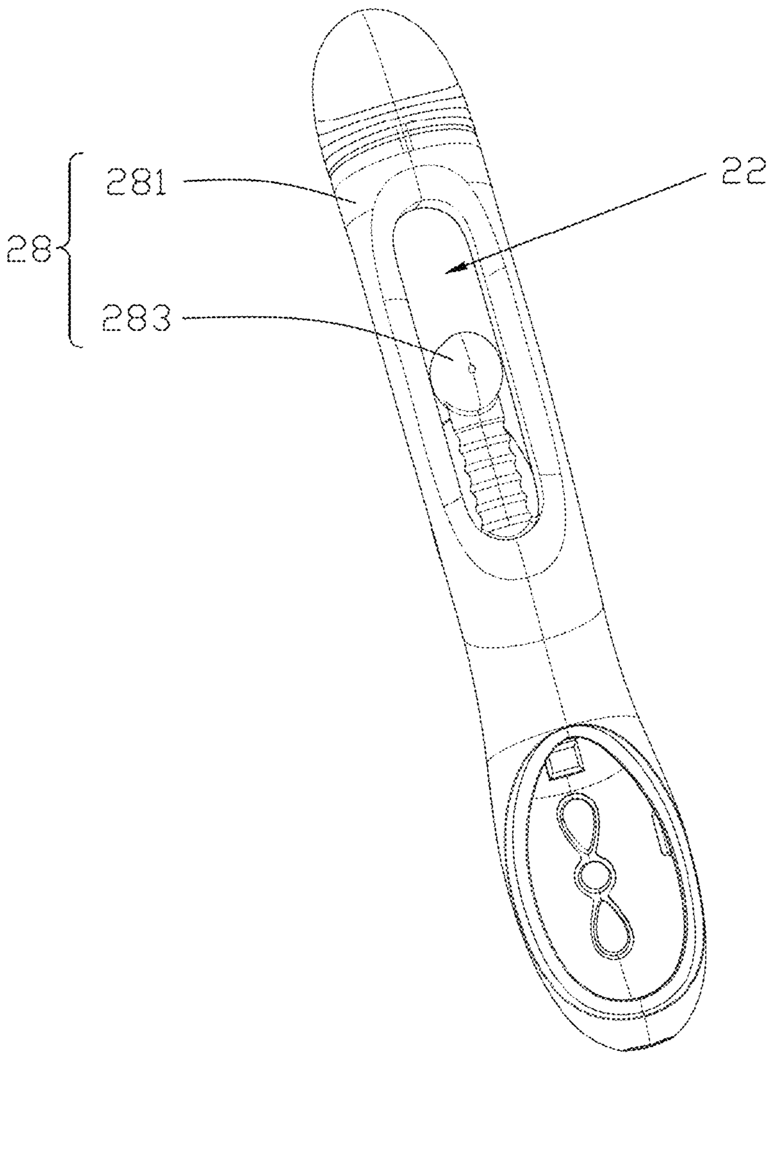
FIG. 23 is a perspective view of an outer shell of the massage device according to a third embodiment of the present disclosure.

Referring to FIG. 11, FIG. 13 and FIG. 23, in this embodiment, the hollow space 241 is formed between the two support arms 24 and provides with the first opening 231 and the opposite second opening 233. When the outer shell 28 covers the massage device 300, the hollow space 241 defines the moving space 22, which also provides with the first opening 231 and the opposite second opening 233. The massage member 40 is movably installed within the moving space 22 and the two ends of the massage member 40 extend and expose outside the inner shell 26 through the first opening 231 and the second opening 233.

The first cover 281 covers the handle housing 121 and the support arms 24. The second cover 283*a* covers the massage member 40 and the extension bar 65. One end of the second cover 283*a* is connected to the handle housing 121 and the other end is not connected to the bottom of the head portion 10.

The second cover 283*a* is a folding structure. Thus, in the first direction X of the inner shell 26, when the massage member 40 moves from the handle housing 121 towards the head portion 10, the portion of the second cover 283*a* far from the head portion 10 is stretched. When the massage member 40 moves from the head portion 10 towards the handle housing 121, the portion of the second cover 283*a* far from the head portion 10 is compressed, so as to move telescopically follow the massage member 40.

The second cover 283*a* is made of a flexible material with elasticity, thereby the second cover 283*a* that envelopes the ends of the massage member 40 is protruding. Furthermore, when the massage member 40 reciprocating move under the second cover 283*a* with respect to the inner shell 26, the second cover 283*a* does not prevent the massage member 40 from moving.

Also, the massage device 300 according to the present embodiment configured as described above can achieve advantages similar to those by the first embodiment.

Fourth Embodiment

A description is given next of a fourth embodiment. For the sake of convenience of explanation, parts identical to those in the foregoing second embodiment shown in FIG. 11 to FIG. 22 are denoted by identical reference signs and are not described again for brevity. This embodiment is different in structure of the second cover 283*a* and the moving space 22.

Figure 24:
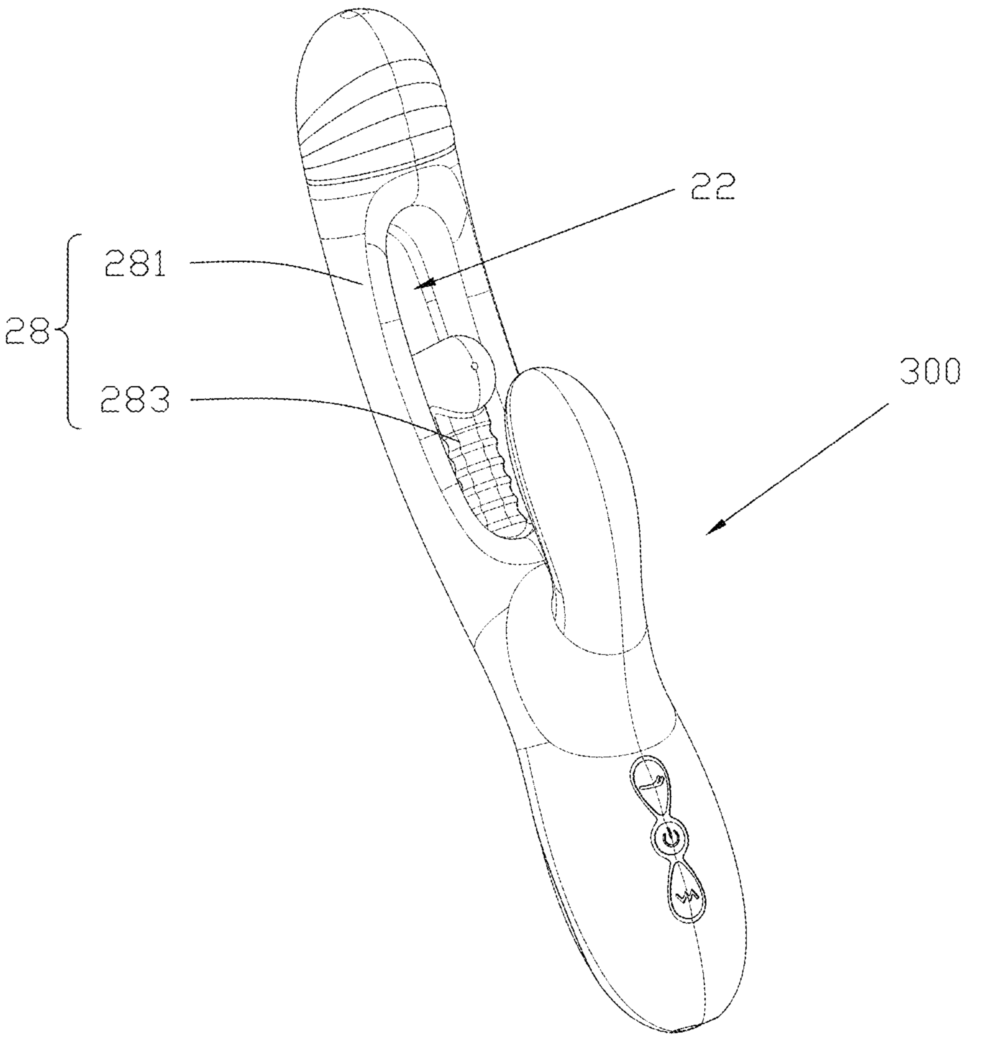
FIG. 24 is an isometric, assembled view of a massage device according to a fourth embodiment of the present disclosure, the massage device including a shell and a massage head.

Referring to FIG. 11 and FIG. 24, in this embodiment, the hollow space 241 is formed between the two support arms 24 and provides with the first opening 231 and the opposite second opening 233. When the outer shell 28 covers the massage device 400, the hollow space 241 defines a groove 18, which only provides with the first opening 231. The massage member 40 is movably installed within the groove 18 and the one end of the massage member 40 extends and exposes outside the inner shell 26 through the first opening 231.

The first cover 281*b* covers the handle housing 121, the outer wall of the support arms 24 and at least a portion of the opposite inner wall of the support arms 24. The second cover 283*b* covers the massage member 40 and the extension bar 65. One end of the second cover 283*b* is connected to the handle housing 121 and the other end is not connected to the bottom of the head portion 10.

The second cover 283*b* is a folding structure. Thus, in the first direction X of the inner shell 26, when the massage member 40 moves from the handle housing 121 towards the head portion 10, the portion of the second cover 283*b* far from the head portion 10 is stretched. When the massage member 40 moves from the head portion 10 towards the handle housing 121, the portion of the second cover 283*b* far from the head portion 10 is compressed, so as to move telescopically follow the massage member 40.

The second cover 283*b* is made of a flexible material with elasticity, thereby the second cover 283*a* that envelopes the ends of the massage member 40 is protruding. Furthermore, when the massage member 40 reciprocating move under the second cover 283*b* with respect to the inner shell 26, the second cover 283*b* does not prevent the massage member 40 from moving.

Also, the massage device 400 according to the present embodiment configured as described above can achieve advantages similar to those by the first embodiment.

Fifth Embodiment

A description is given next of a fifth embodiment. For the sake of convenience of explanation, parts identical to those in the foregoing second embodiment shown in FIG. 11 to FIG. 22 are denoted by identical reference signs and are not described again for brevity. This embodiment is different in structure of the second cover 283*d*.

Figure 25:
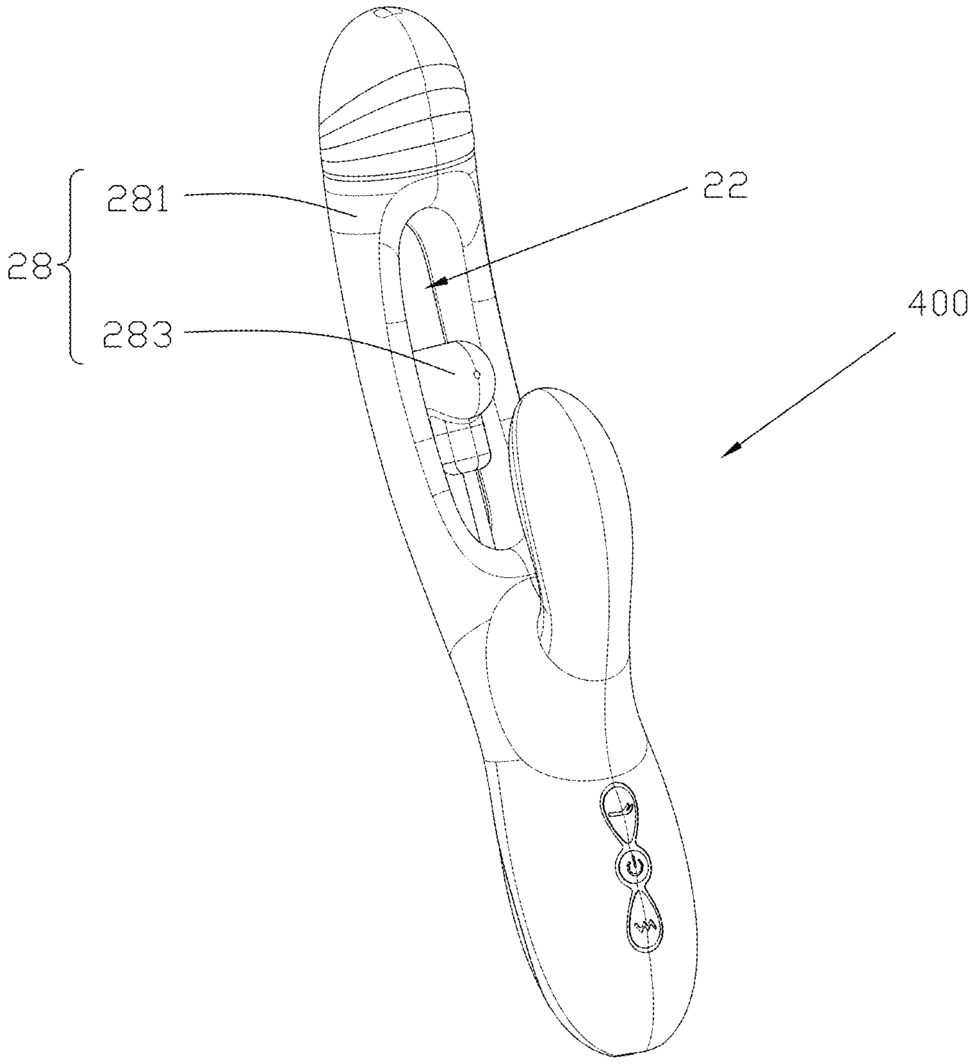
FIG. 25 is an isometric, assembled view of a massage device according to a fifth embodiment of the present disclosure, the massage device including a shell and a massage head.

Referring to FIG. 11, FIG. 13 and FIG. 25, in this embodiment, the hollow space 241 is formed between the two support arms 24 and provides with the first opening 231 and the opposite second opening 233. As the outer shell 28 covers the massage device 500, the hollow space 241 defines the moving space 22, which also provides with the first opening 231 and the opposite second opening 233. The massage member 40 is movably installed within the moving space 22 and the two ends of the massage member 40 extend and expose outside the inner shell 26 through the first opening 231 and the second opening 233.

The first cover 281*d* covers the handle housing 121 and the support arms 24. The second cover 283*b* covers the massage member 40 and at least a portion of the extension bar 65. Both two ends of the second cover 283*d* are not connected to the inner shell 26, that is, the first cover 281 and the second cover 283*d* are not integrally formed structure.

Also, the massage device 500 according to the present embodiment configured as described above can achieve advantages similar to those by the first embodiment.

The five embodiments presented above show multiple structures of the outer shell 28 and multiple forms of the massage member 40. In the description of the present disclosure, the outer shell 28 having three structures. The first one is the outer shell 28 completely covers the two support arms 24, such as the first embodiment, the second embodiment and the fifth embodiment. The second one is the outer shell 28 covers a portion of the support arms 24, such as the third embodiment. The third one is the outer shell 28 covers at least one protruding end of the massage member 40 and does not cover the opposite inner wall of the support arms 24, such as the fourth embodiment. It can be understood that the structures of the outer shell 28 are not limited to the above three, such as the outer shell 28 completely does not cover the massage member 40.

In the description of the present disclosure, the massage member 40 having three forms. The first form is two ends of the massage member 40 protruding outside the inner shell 26. The second form is only one end of the massage member 40 protruding outside the inner shell 26. The third form is both two ends of the massage member 40 do not protrude outside the inner shell 26. It can be understood that the forms of the massage member 40 are not limited to the above three.

Sixth Embodiment

Figure 26:
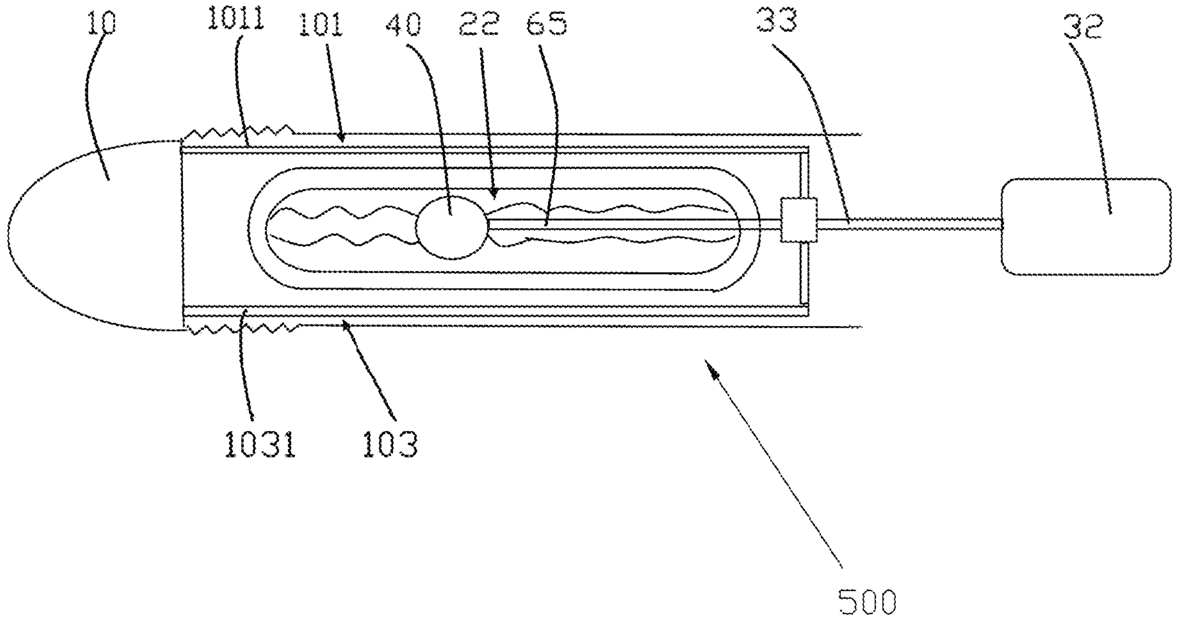
FIG. 26 is schematic diagram of the massage device according to the sixth embodiment of the present disclosure.

Referring to FIG. 26, in this embodiment, a first groove 101 and a second groove 103 are provided within two support arms 24, respectively. A first rod 1011 is installed in the first groove 101. One end of the first rod 1011 is connected to an extension bar 65 and another end is connected to the head portion 10. A second rod 1031 is installed in the second groove 103. One end of the second rod 1031 is connected to the extension bar 65 and another end is connected to the head portion 10. When the driving motor 32 drives the extension bar 65 to reciprocate in a sliding motion, thereby causing the massage member 40 to perform reciprocating extension and/or retraction motion within the moving space 22. At the same time, the extension bar 65 drives the first rod 1011 and the second rod 1031 to extend and retract, causing the head portion 10 to reciprocate relative to the two support arms 24. It can be understood that the massage device 600 of this embodiment can be configured with only the first rod 1011 or the second rod 1031 to drive the movement of the head portion 10.

The contents not described in detail in this specification are known to those skilled in the art.

In the description of the present disclosure, it should be understood that terms such as "center", "longitudinal", "lateral", "length", "width", "thickness", "top", "bottom", "front", "rear", "left", "right", "vertical", "horizontal", "upper", "lower", "inner", "outer", "clockwise", "counterclockwise", etc., indicate the orientation or positional relationship based on the orientation or positional relationship shown in the drawings. These terms are used for descriptive purposes and are not to be construed as limiting, indicating, or implying any particular orientation, construction or operation for the devices or arms referred to. Therefore, it should be understood that the terms "first," "second," etc., are used for descriptive purposes only and do not imply or suggest any relative importance or indicate the quantity of technical features indicated.

The foregoing illustrates and describes the basic principles and main features of the present disclosure and its advantages. Those skilled in the art should understand that the present disclosure is not limited to the embodiments described above. The embodiments and descriptions in the specification are intended only to illustrate the principles of the present disclosure. Within the scope and spirit of the present disclosure, various modifications and improvements can be made which fall within the scope of protection defined by the appended claims and their equivalents.

What is claimed is:

1. A massage device comprising:

a shell comprising a tubular portion configured to be inserted into a hole-shaped part of a rectum or a vagina of a user to be massaged along an insertion direction, the tubular portion providing a first stimulus, the shell comprising a front portion, a rear portion, a first lateral support arm extending between the front portion and the rear portion and a second lateral support arm extending between the front portion and the rear portion, the second lateral support arm is opposite from the first lateral support arm, the first lateral support arm configured to face the second lateral support arm;

a recess formed in an inward concave manner along a radial direction of the tubular portion within the tubular portion, the recess defining a first opening and a moving space inside the shell, the moving space communicating to an exterior environment of the massage device via the first opening, the recess penetrates a portion of the shell corresponding to the tubular portion and further defines a second opening opposite to the first opening, the second opening communicates to the exterior environment of the massage device, the first opening is a top opening of the massage device, and the second opening is a bottom opening of the massage device, the moving space is positioned between the front portion of the massage device and the rear portion of the massage device, the moving space is defined by an interior surface of the front portion, an interior surface of the rear portion, an interior surface of the first lateral support arm and an interior surface of the second lateral support arm;

a first massage module providing a second stimulus, the first massage module comprising at least one massage head disposed in the moving space and having a first massage surface protruding out of the recess via the first opening; and a driving assembly comprising:

a motor, a transmission module; and a connecting member having a first end connected to the at least one massage head, and a second end connected to a transmission end of the transmission module, wherein the at least one massage head is driven by the connecting member, and the at least one massage head moves forward and backward in the moving space, whereby, when the at least one massage head is positioned between a rear side of the moving space and a front side of the moving space, a top portion of the at least one massage head comprising the first massage surface protrudes past the first opening and into the exterior environment to massage a first interior part of the rectum or the vagina and while the top portion protrudes past the first opening, a bottom portion of the at least one massage head protrudes past the second opening and into the exterior environment to massage a second interior part of the rectum or the vagina that is opposite to the first interior part, the at least one massage head is configured to move linearly from the front side of the moving space to the rear side of the moving space, when the at least one massage head moves toward the front side, both the top portion and the bottom portion of the at least one massage head are configured to move toward the front side and when the at least one massage head move toward the rear side, both the top portion and the bottom portion of the at least one massage head are configured to move towards the rear side.

2. The massage device according to claim 1, wherein the at least one massage head further comprises a connecting portion, a soft casing and a vibration member, the connecting portion is connected to the first end of the connecting member, the vibration member is accommodated in the soft casing.

3. The massage device according to claim 2, wherein the vibration member generates vibrations and transmits the vibrations to the first massage surface, such that the first massage surface vibrates.

4. The massage device according to claim 1, wherein the shell comprises an inner shell accommodating the driving assembly and an outer shell covering the inner shell, the inner shell is made of a first material, the at least one massage head is made of a second material, the outer shell is made of a third material, and an elasticity of the first material is less than an elasticity of the second material, and an elasticity of the third material is more than the elasticity of the second material.

5. The massage device according to claim 1, wherein the connecting member of the driving assembly comprises a screw sleeved on a driving terminal of the motor, a sliding block movably sleeved on the screw, and an extension bar connecting the sliding block and the at least one massage head, the screw is provided with a spiral sliding groove, one end of the extension bar is connected to the sliding block, and another end of the extension bar is connected to the at least one massage head, the extension bar is configured to drive the at least one massage head.

6. The massage device according to claim 5, wherein the sliding block comprises a first portion and a second portion extending and protruding from the first portion, the first portion is sleeved on the screw and the second portion is connected to the extension bar, the second portion defines a through hole, the sliding block and the extension bar are engaged with each other by inserting one end of the extension bar into the through hole, the extension bar and the screw are parallel to each other and arranged at an interval.

7. The massage device according to claim 1, wherein the connecting member includes a shaft horizontally arranged, and a length of the shaft in the moving space gradually increases when the at least one massage head moves along the insertion direction.

8. The massage device according to claim 7, wherein the at least one massage head is vertically attached to an end of the shaft, the at least one massage head includes a base connected to the shaft, a first protrusion the top portion of the at least one massage head fastened on a top of the base and protruding out of the moving space.

9. The massage device according to claim 8, wherein a second protrusion the bottom portion of the at least one massage head is fastened on a bottom of the base, the first massage surface is formed on the first protrusion, and the first massage surface is soft.

10. The massage device according to claim 1, wherein a gap is defined between the at least one massage head and the shell, and a length of the gap is extended along the insertion direction.

11. The massage device according to claim 1, wherein the motor drives the transmission module to rotate, and the connecting member moves along the insertion direction when the transmission module rotates.

* * * * *